United States Patent
Huang et al.

(10) Patent No.: US 11,515,970 B2
(45) Date of Patent: Nov. 29, 2022

(54) PRIORITY-BASED HYBRID AUTOMATIC REPEAT REQUEST ACKNOWLEDGEMENT (HARQ-ACK) FEEDBACK

(71) Applicant: QUALCOMM Incorporated, San Diego, CA (US)

(72) Inventors: Yi Huang, San Diego, CA (US); Wei Yang, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/112,236

(22) Filed: Dec. 4, 2020

(65) Prior Publication Data
US 2022/0182190 A1    Jun. 9, 2022

(51) Int. Cl.
*H04L 1/18* (2006.01)
*H04B 1/713* (2011.01)
*H04L 5/00* (2006.01)
*H04L 27/26* (2006.01)

(52) U.S. Cl.
CPC .......... *H04L 1/1819* (2013.01); *H04B 1/713* (2013.01); *H04L 1/1854* (2013.01); *H04L 5/0055* (2013.01); *H04L 27/2607* (2013.01)

(58) Field of Classification Search
CPC ... H04L 1/1819; H04L 1/1854; H04L 5/0055; H04L 27/2607; H04B 1/713
See application file for complete search history.

(56) References Cited

U.S. PATENT DOCUMENTS

| | | | | |
|---|---|---|---|---|
| 2006/0156172 A1* | 7/2006 | Kim | ...................... | H04L 1/0071 714/755 |
| 2019/0036667 A1* | 1/2019 | Wang | .................... | H04L 5/0055 |
| 2019/0261391 A1* | 8/2019 | Kundu | ............. | H04W 72/0446 |
| 2020/0177424 A1* | 6/2020 | Noh | ...................... | H04L 5/0055 |
| 2020/0295878 A1* | 9/2020 | Choi | ................ | H04L 5/0053 |
| 2020/0396758 A1* | 12/2020 | Falahati | ............ | H04W 72/1284 |
| 2021/0297966 A1* | 9/2021 | Noh | ..................... | H04W 56/001 |
| 2021/0352656 A1* | 11/2021 | Choi | ................. | H04W 72/0466 |
| 2021/0391955 A1* | 12/2021 | He | ......................... | H04L 1/1861 |
| 2022/0061077 A1* | 2/2022 | Choi | ................. | H04W 72/1284 |

OTHER PUBLICATIONS

3GPP TSG-RAN WG1 Meeting #98b R1-19xxxxx, Source: Ericsson, Title: Feature lead summary for UL Signals and Channels Chongqing, China, Aug. 14-20, 2019 (Year: 2019).*

(Continued)

*Primary Examiner* — Ivan O Latorre
*Assistant Examiner* — Malick A Sohrab
(74) *Attorney, Agent, or Firm* — Harrity & Harrity, LLP

(57) ABSTRACT

Various aspects of the present disclosure generally relate to wireless communication. In some aspects, a user equipment (UE) may map hybrid automatic repeat request acknowledgement (HARQ-ACK) feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit. The UE may transmit, to a base station, the HARQ-ACK feedback via a physical uplink control channel (PUCCH) format 0. Numerous other aspects are provided.

30 Claims, 11 Drawing Sheets

(56) References Cited

OTHER PUBLICATIONS

3GPP TSG RAN WG1 #103-e, R1-2009185, e-Meeting, Source: NTT Docomo, Inc. Title: Discussion on intra-UE multiplexing/prioritization for Rei.17 URLLC, Oct. 26-Nov. 13, 2020 (Year: 2020).*
3GPP TSG RAN WG1 #103-e R1-2009136 e-Meeting, Source: Sharp. Title: Enhancements on intra-UE UCI multiplexing and PUSCH prioritization, Oct. 26-Nov. 13, 2020 (Year: 2020).*
International Search Report and Written Opinion—PCT/US2021/072209—ISA/EPO—dated Feb. 14, 2022.
NTT Docomo, Inc: "Discussion on Intra-UE Multiplexing/Prioritization for Rel.17 Urllc", 3GPP Draft, R1 -2009185, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020 (Oct. 23, 2020), XP051945516, pp. 1-11, Retrieved from the Internet: URL:https://ftp.3gpp.org/tsg_ran/WG1_RL1/TSGR1_103-e/Docs/R1-2009185.zip, R1-2009185.docx [retrieved on Oct. 23, 2020] the whole document.
SHARP: "Enhancements on Intra-UE UCI Multiplexing and PUSCH Prioritization", 3GPP Draft, R1-2009136, 3GPP TSG RAN WG1 #103-e, 3rd Generation Partnership Project (3GPP), Mobile Competence Centre, 650, Route Des Lucioles, F-06921 Sophia-Antipolis Cedex, France, vol. Ran WG1, No. e-Meeting,Oct. 26, 2020-Nov. 13, 2020, Oct. 24, 2020 (Oct. 24, 2020), XP051946853, pp. 1-7, Retrieved from the Internet: URL:https://ftp.3gpp.org/tsg_ran/WG1_RL1/TSGR1_103-e/Docs/R1-2009136.zip, R1-2009136.docx [retrieved on Oct. 24, 2020] the whole document.

* cited by examiner

US 11,515,970 B2

PRIORITY-BASED HYBRID AUTOMATIC REPEAT REQUEST ACKNOWLEDGEMENT (HARQ-ACK) FEEDBACK

FIELD OF THE DISCLOSURE

Aspects of the present disclosure generally relate to wireless communication and to techniques and apparatuses for priority-based hybrid automatic repeat request acknowledgement (HARQ-ACK) feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes mapping HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and transmitting, to a base station, the HARQ-ACK feedback via a physical uplink control channel (PUCCH) format 0.

In some aspects, a method of wireless communication performed by a base station includes transmitting downlink data to a UE; and receiving, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

In some aspects, a UE for wireless communication includes a memory and one or more processors operatively coupled to the memory, the memory and the one or more processors configured to: map HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and transmit, to a base station, the HARQ-ACK feedback via a PUCCH format 0.

In some aspects, a base station for wireless communication includes a memory and one or more processors operatively coupled to the memory, the memory and the one or more processors configured to: transmit downlink data to a UE; and receive, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

In some aspects, a non-transitory computer-readable medium storing a set of instructions for wireless communication includes one or more instructions that, when executed by one or more processors of a UE, cause the UE to: map HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and transmit, to a base station, the HARQ-ACK feedback via a PUCCH format 0.

In some aspects, a non-transitory computer-readable medium storing a set of instructions for wireless communication includes one or more instructions that, when executed by one or more processors of a base station, cause the base station to: transmit downlink data to a UE; and receive, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

In some aspects, an apparatus for wireless communication includes means for mapping HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and means for transmitting, to a base station, the HARQ-ACK feedback via a PUCCH format 0.

In some aspects, an apparatus for wireless communication includes means for transmitting downlink data to a UE; and means for receiving, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
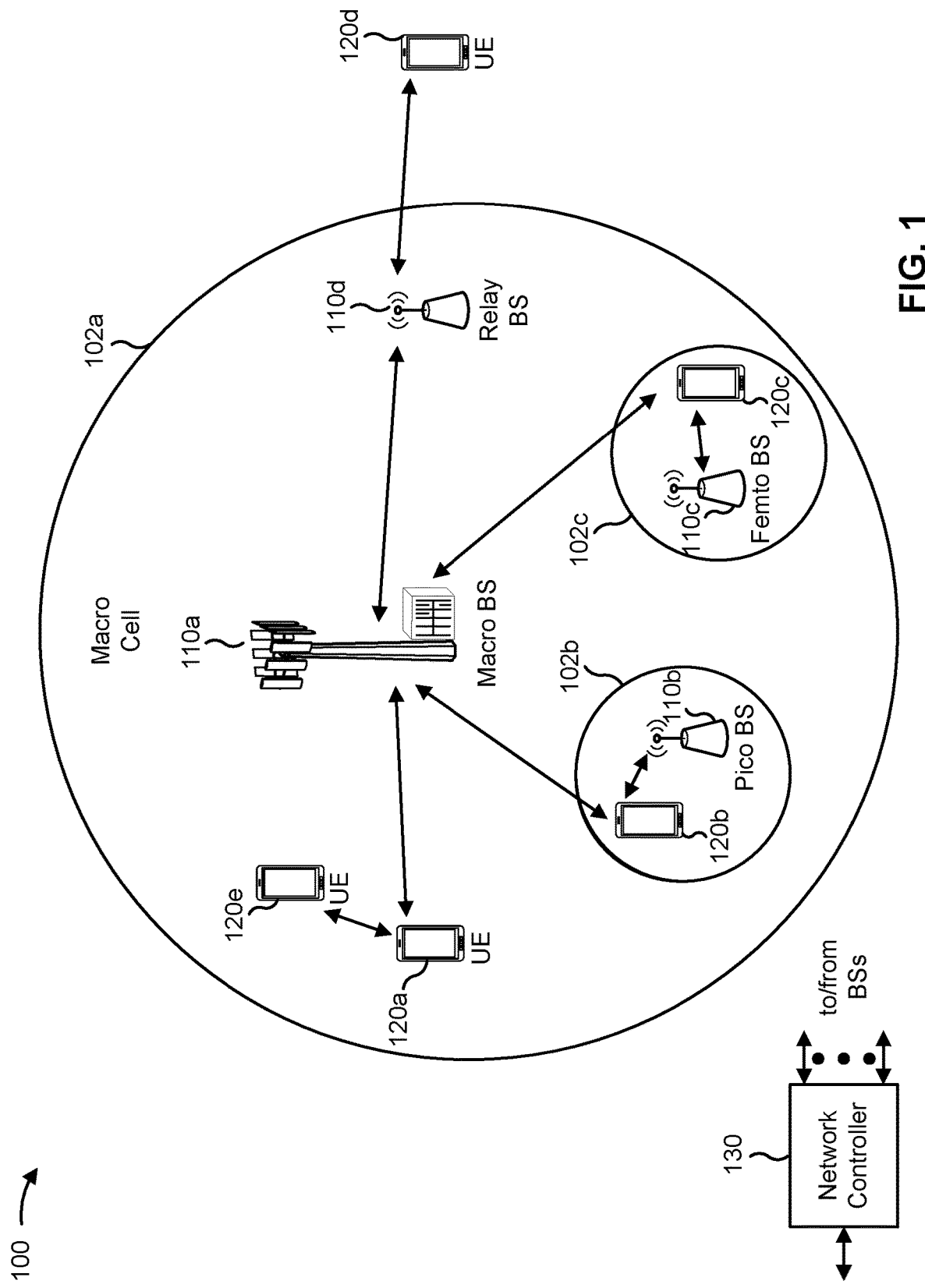
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
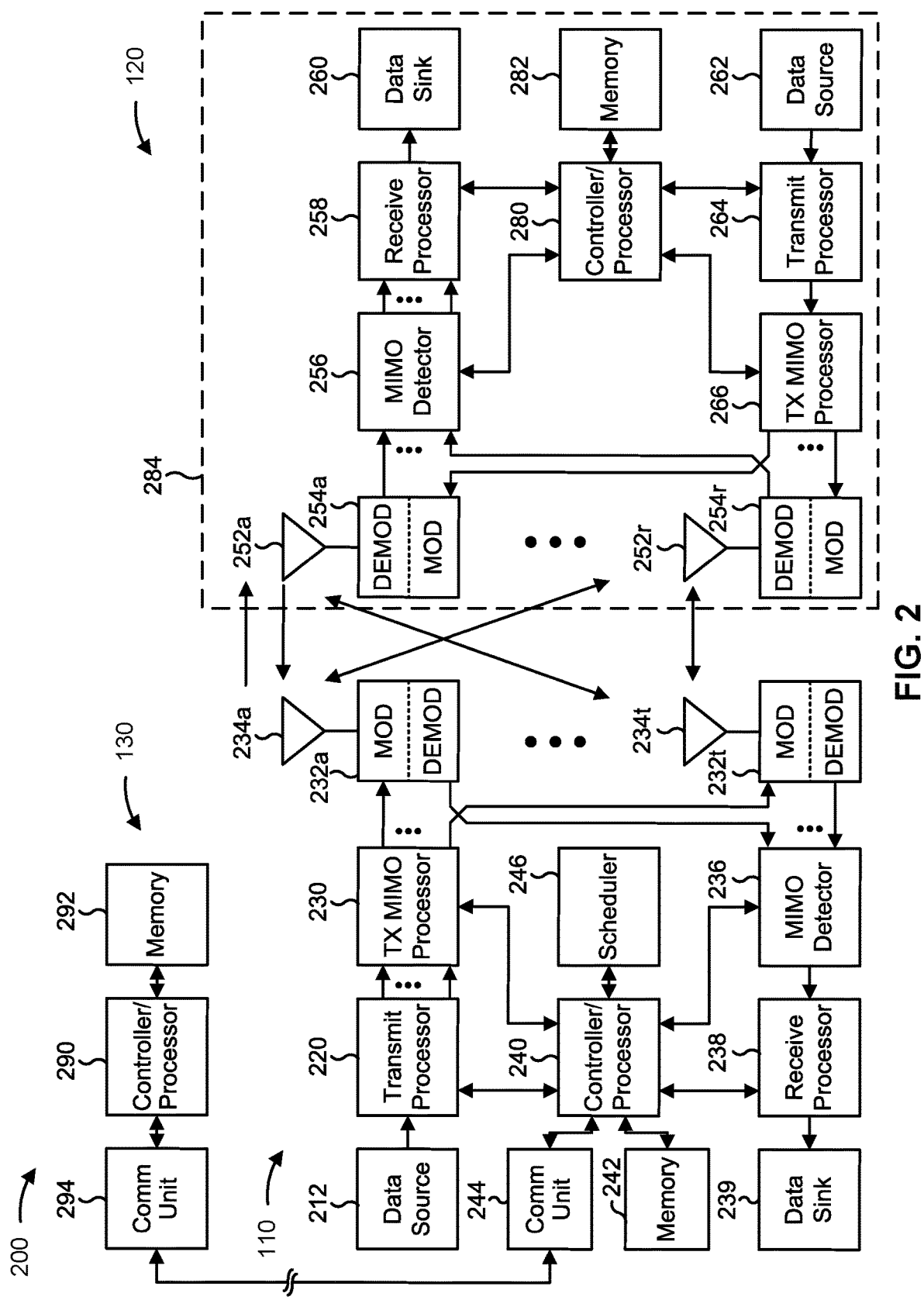
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-9.

Controller/processor 240 of base station 110, controller/processor 280 of UE 120, and/or any other component(s) of FIG. 2 may perform one or more techniques associated with priority-based HARQ-ACK feedback, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a UE (e.g., UE 120) includes means for mapping HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and/or means for transmitting, to a base station, the HARQ-ACK feedback via a PUCCH format 0. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting, without frequency hopping, the first HARQ-ACK bit associated with the high priority using a first symbol and transmitting the second HARQ-ACK bit associated with the low priority using a second symbol.

In some aspects, the UE includes means for transmitting, without frequency hopping, the first HARQ-ACK bit associated with the high priority using a first symbol and transmitting the first HARQ-ACK bit associated with the high priority and the second HARQ-ACK bit associated with the low priority using a second symbol.

In some aspects, the UE includes means for transmitting the first HARQ-ACK bit associated with the high priority and the second HARQ-ACK bit associated with the low priority using a first symbol, and means for transmitting the first HARQ-ACK bit associated with the high priority and the second HARQ-ACK bit associated with the low priority using a second symbol.

In some aspects, the UE includes means for transmitting the first HARQ-ACK bit associated with the high priority using a first symbol, and means for transmitting the first HARQ-ACK bit associated with the high priority and the second HARQ-ACK bit associated with the low priority using a second symbol.

In some aspects, a base station (e.g., base station 110) includes means for transmitting downlink data to a UE; and/or means for receiving, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving, without frequency hopping, the first HARQ-ACK bit associated with the high priority using a first symbol and receiving the second HARQ-ACK bit associated with the low priority using a second symbol.

In some aspects, the base station includes means for receiving, without frequency hopping, the first HARQ-ACK bit associated with the high priority using a first symbol and receiving the first HARQ-ACK bit associated with the high priority and the second HARQ-ACK bit associated with the low priority using a second symbol.

In some aspects, the base station includes means for receiving the first HARQ-ACK bit associated with the high priority and the second HARQ-ACK bit associated with the low priority using a first symbol, and means for receiving the first HARQ-ACK bit associated with the high priority and the second HARQ-ACK bit associated with the low priority using a second symbol.

In some aspects, the base station includes means for receiving the first HARQ-ACK bit associated with the high priority using a first symbol, and means for receiving the first HARQ-ACK bit associated with the high priority and the second HARQ-ACK bit associated with the low priority using a second symbol.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

HARQ-ACK feedback including a two-bit HARQ-ACK value may be transmitted on a PUCCH format 0. The two-bit HARQ-ACK value may include a first HARQ-ACK bit and a second HARQ-ACK bit. The first HARQ-ACK bit and the second HARQ-ACK bit may be associated with a same priority level. In other words, the first HARQ-ACK bit may be associated with a same priority as compared to the second HARQ-ACK bit. The two-bit HARQ-ACK value may also be referred to as an acknowledgement/negative acknowledgement (A/N) value).

The HARQ-ACK feedback may be transmitted via the PUCCH format 0 using a sequence (e.g., a base sequence) with a cyclic shift in a time domain. The cyclic shift may be based at least in part on information bits associated with the HARQ-ACK feedback.

Figure 3:
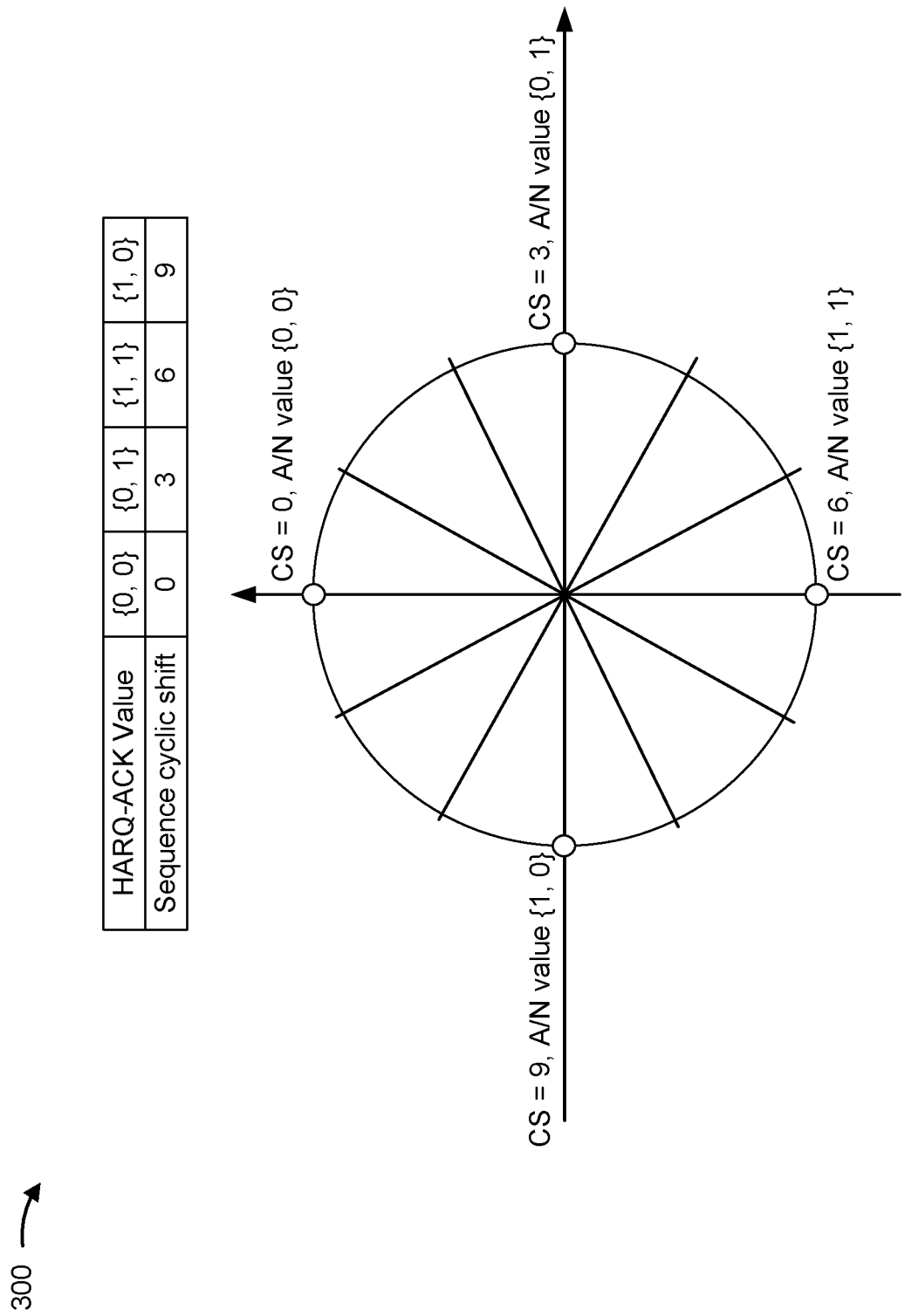
FIG. 3 is a diagram illustrating an example of HARQ-ACK feedback, in accordance with various aspects of the present disclosure.

FIG. 3 is a diagram illustrating an example 300 of HARQ-ACK feedback, in accordance with various aspects of the present disclosure.

As shown in FIG. 3, when the two-bit HARQ-ACK value is equal to {0,0} (e.g., the first HARQ-ACK bit is equal to {0}, and the second HARQ-ACK bit is equal to {1}), the cyclic shift applied to the sequence may be equal to 0. When the two-bit HARQ-ACK value is equal to {0,1} (e.g., the first HARQ-ACK bit is equal to {0}, and the second HARQ-ACK bit is equal to {1}), the cyclic shift applied to the sequence may be equal to 3. When the two-bit HARQ-ACK value is equal to {1,1} (e.g., the first HARQ-ACK bit is equal to {1}, and the second HARQ-ACK bit is equal to {1}), the cyclic shift applied to the sequence may be equal to 6. When the two-bit HARQ-ACK value is equal to {1,0} (e.g., the first HARQ-ACK bit is equal to {1}, and the second HARQ-ACK bit is equal to {0}), the cyclic shift applied to the sequence may be equal to 9.

Depending on the two-bit HARQ-ACK value, the cyclic shift applied to the sequence may be equal to 0, 3, 6, or 9. Distances between some pairs of cyclic shift values may be equal to each other. For example, a distance between the cyclic shift equal to 0 and the cyclic shift equal to 3 is three, a distance between the cyclic shift equal to 3 and the cyclic shift equal to 6 is three, and so on. The distance between cyclic shift values may also refer to a difference between cyclic shift values. For example, both a distance and a difference between the cyclic shift equal to 0 and the cyclic shift equal to 3 is three.

As indicated above, FIG. 3 is provided as an example. Other examples may differ from what is described with regard to FIG. 3.

HARQ-ACK feedback including two HARQ-ACK bits of a same priority may be transmitted using PUCCH format 0. The two HARQ-ACK bits may be mapped to a cyclic shift value (e.g., 0, 3, 6, or 9), where cyclic shift values may be equally spaced apart. Equal spacing between some pairs of cyclic shift values may correspond to an equal priority or no defined priority among different HARQ-ACK bits in the HARQ-ACK feedback. However, this approach does not apply to HARQ-ACK feedback that carries two HARQ-ACK bits of unequal priority. HARQ-ACK feedback may include a first HARQ-ACK bit associated with a high priority and a second HARQ-ACK bit associated with a low priority. The HARQ-ACK feedback may include the first HARQ-ACK bit multiplexed with the second HARQ-ACK bit. If equal spacing between some pairs of cyclic shift values were to be used, the first HARQ-ACK bit associated with the high priority may improperly have a same priority as the second HARQ-ACK bit associated with the low priority.

In various aspects of techniques and apparatuses described herein, a UE may map HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit. The UE may transmit, to a base station, the HARQ-ACK feedback via a PUCCH format 0.

Figure 4:
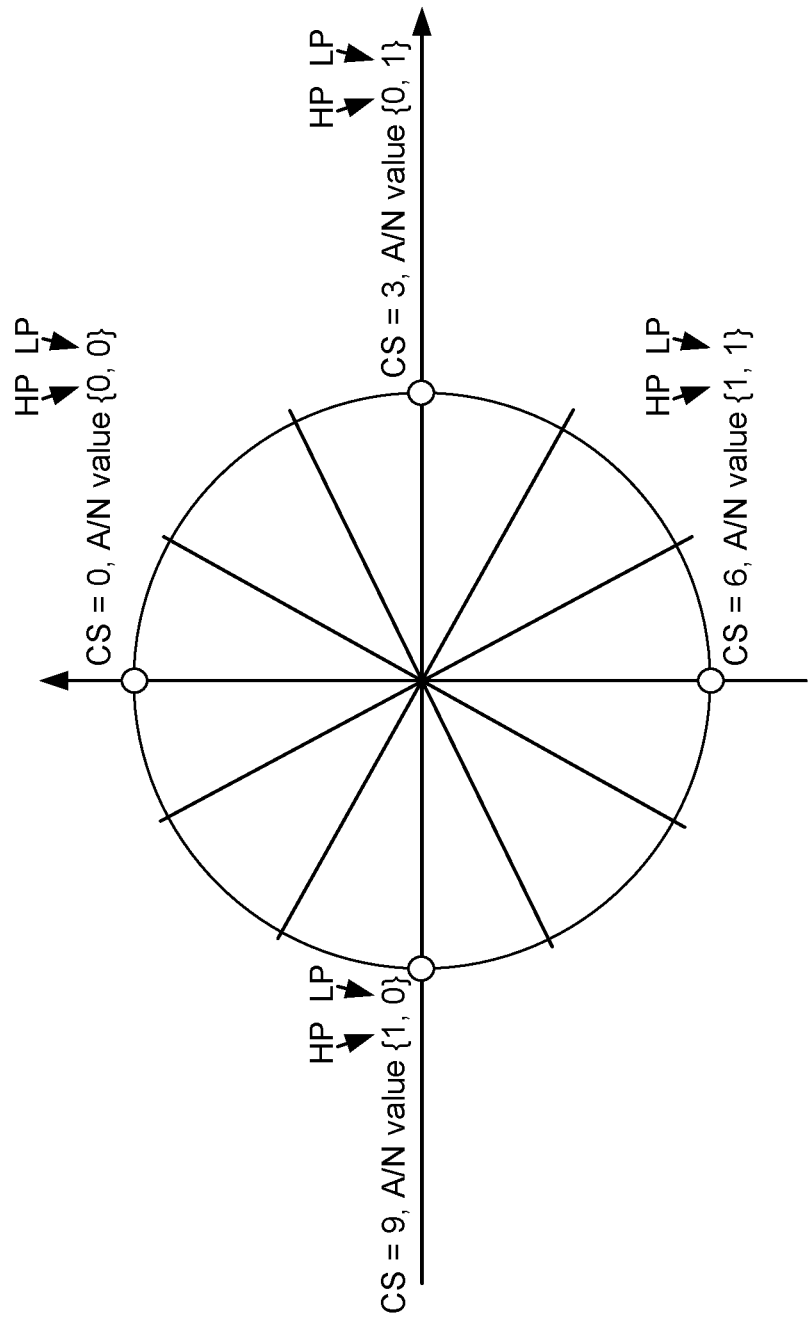
FIGS. 4-7 are diagrams illustrating examples associated with priority-based HARQ-ACK feedback, in accordance with various aspects of the present disclosure.

FIG. 4 is a diagram illustrating an example 400 associated with priority-based HARQ-ACK feedback, in accordance with various aspects of the present disclosure.

A UE (e.g., UE 120) may transmit, to a base station (e.g., base station 110), HARQ-ACK feedback including a two-bit HARQ-ACK value on a PUCCH format 0. The two-bit HARQ-ACK value may include a first HARQ-ACK bit associated with a high priority and a second HARQ-ACK bit associated with a low priority. In other words, the first HARQ-ACK bit may be associated with a different priority as compared to the second HARQ-ACK bit. The first HARQ-ACK bit associated with the high priority may correspond to a most significant bit (MSB), and the second HARQ-ACK bit associated with the low priority may correspond to a least significant bit (LSB). The two-bit HARQ-ACK value may also be referred to as an acknowledgement/negative acknowledgement (A/N) value).

The HARQ-ACK feedback may be transmitted via the PUCCH format 0 using a sequence with a cyclic shift in a time domain. The cyclic shift may be based at least in part on information bits associated with the HARQ-ACK feedback.

As shown in FIG. 4, when the two-bit HARQ-ACK value is equal to {0,0} (e.g., the first HARQ-ACK bit associated with the high priority (HP) is equal to {0}, and the second HARQ-ACK bit associated with the low priority (LP) is equal to {1}), the cyclic shift applied to the sequence may be equal to 0. When the two-bit HARQ-ACK value is equal to {0,1} (e.g., the first HARQ-ACK bit associated with the high priority is equal to {0}, and the second HARQ-ACK bit associated with the low priority is equal to {1}), the cyclic shift applied to the sequence may be equal to 3. When the two-bit HARQ-ACK value is equal to {1,1} (e.g., the first HARQ-ACK bit associated with the high priority is equal to {1}, and the second HARQ-ACK bit associated with the low priority is equal to {1}), the cyclic shift applied to the sequence may be equal to 6. When the two-bit HARQ-ACK value is equal to {1,0} (e.g., the first HARQ-ACK bit associated with the high priority is equal to {1}, and the second HARQ-ACK bit associated with the low priority is equal to {0}), the cyclic shift applied to the sequence may be equal to 9.

Depending on the two-bit HARQ-ACK value, the cyclic shift applied to the sequence may be equal to 0, 3, 6, or 9. The cyclic shift may be selected from 12 possible cyclic shift values. Distances between some pairs of cyclic shift values may be equal to each other. For example, a distance between the cyclic shift equal to 0 and the cyclic shift equal to 3 is three, a distance between the cyclic shift equal to 3 and the cyclic shift equal to 6 is three, and so on.

In some aspects, an equal distance between some pairs of cyclic shift values may correspond to equal reliability between the first HARQ-ACK bit associated with the high priority and the second HARQ-ACK bit associated with the low priority. In other words, a reliability of the first HARQ-ACK bit may be the same as a reliability of the second HARQ-ACK bit, which may be improper since the first HARQ-ACK bit is associated with the high priority and the second HARQ-ACK bit is associated with the low priority.

In some aspects, the relationship between the equal distance between some pairs of cyclic shift values and the equal reliability between HARQ-ACK bits may be based at least in part on a decoding error likelihood at a base station. When possible cyclic shift values corresponding to HARQ-ACK values (e.g., {0,0}, {0,1}, {1,1}, or {1,0}) are spaced equally apart, a likelihood that the base station decodes a HARQ-ACK value in error (e.g., due to a noisy channel) may be equal to a likelihood of decoding errors associated with other HARQ-ACK values. In other words, due to the equal spacing between cyclic shift values, a likelihood of successfully decoding the first HARQ-ACK bit associated with the high priority may be the same as a likelihood of successfully decoding the second HARQ-ACK bit associated with the low priority.

As indicated above, FIG. 4 is provided as an example. Other examples may differ from what is described with regard to FIG. 4.

Figure 5:
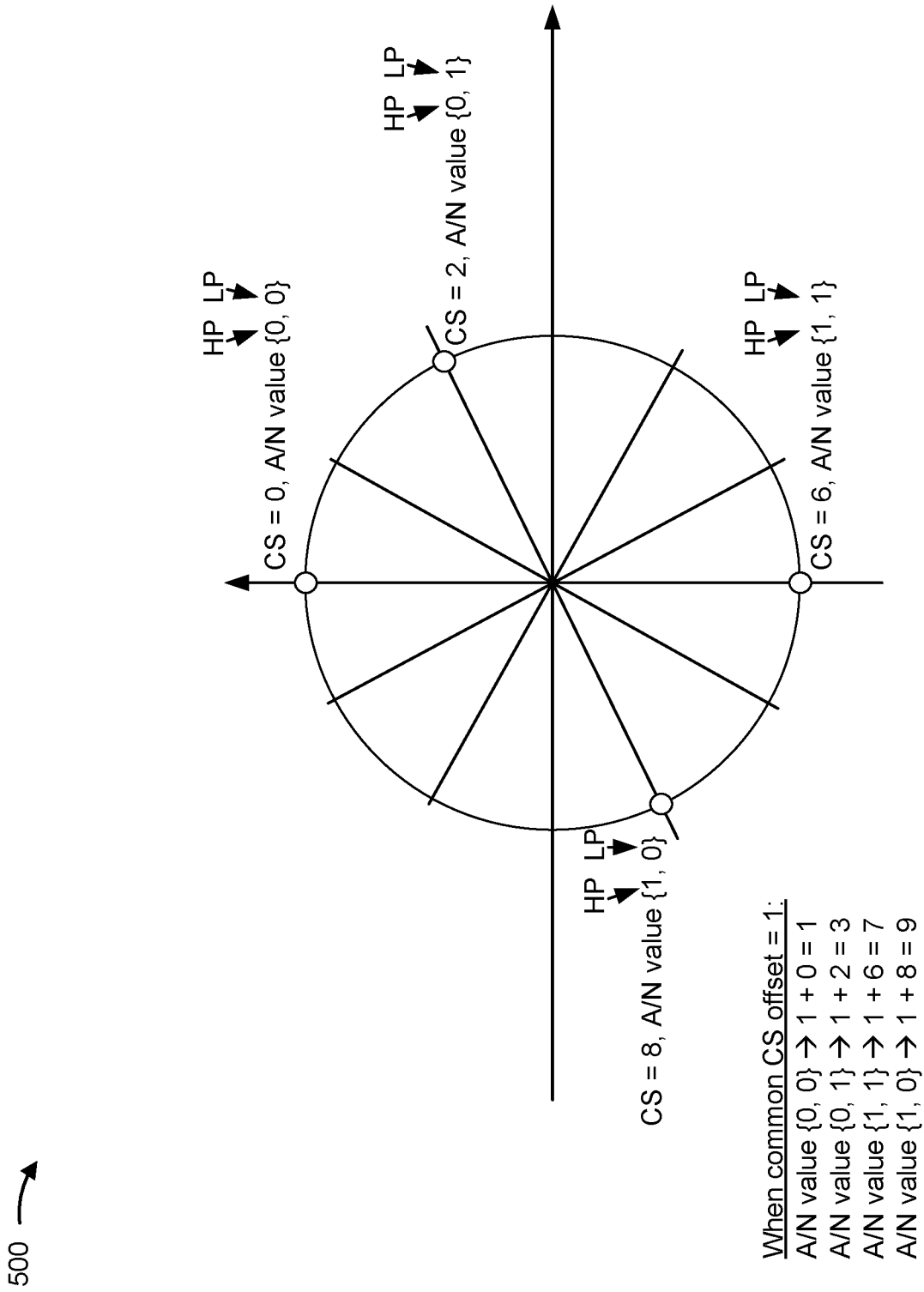

FIG. 5 is a diagram illustrating an example 500 associated with priority-based HARQ-ACK feedback, in accordance with various aspects of the present disclosure.

A UE (e.g., UE 120) may transmit, to a base station (e.g., base station 110), HARQ-ACK feedback including a two-bit HARQ-ACK value on a PUCCH format 0. The two-bit HARQ-ACK value may include a first HARQ-ACK bit associated with a high priority and a second HARQ-ACK bit associated with a low priority. The first HARQ-ACK bit associated with the high priority may correspond to an MSB, and the second HARQ-ACK bit associated with the low priority may correspond to an LSB.

The HARQ-ACK feedback may be transmitted via the PUCCH format 0 using a sequence with a cyclic shift in a time domain. The cyclic shift may be based at least in part on information bits associated with the HARQ-ACK feedback.

In some aspects, the HARQ-ACK feedback may be a first HARQ-ACK value that includes a high priority bit of {0} and a low priority bit of {0}, and the first HARQ-ACK value may be associated with a first sequence cyclic shift value. The HARQ-ACK feedback may be a second HARQ-ACK value that includes a high priority bit of {0} and a low priority bit of {1}, and the second HARQ-ACK value may be associated with a second sequence cyclic shift value. The HARQ-ACK feedback may be a third HARQ-ACK value that includes a high priority bit of {1} and a low priority bit of {1}, and the third HARQ-ACK value may be associated with a third sequence cyclic shift value. The HARQ-ACK feedback may be a fourth HARQ-ACK value that includes a high priority bit of {1} and a low priority bit of {0}, and the fourth HARQ-ACK value may be associated with a fourth sequence cyclic shift value.

In some aspects, a distance between the first sequence cyclic shift value associated with the high priority bit of "0" and the third sequence cyclic shift value associated with the high priority bit of "1" may be set to N/2 to reduce a decoding error likelihood of the first HARQ-ACK bit associated with the high priority at the base station, where N is a total number of available cyclic shift values (e.g., 12 available cyclic shift values ranging from 0 to 11) associated with a sequence to transmit the PUCCH format 0. In some aspects, a distance between the second sequence cyclic shift value associated with the high priority bit of "0" and the fourth sequence cyclic shift value associated with the high priority bit of "1" may be set to N/2 to reduce a decoding error likelihood of the first HARQ-ACK bit associated with the high priority at the base station.

In some aspects, a distance between the first sequence cyclic shift value associated with the high priority bit of "0" and the low priority bit of "0" and the second sequence cyclic shift value associated with the high priority bit of "0" and the low priority bit of "1" may be set to less than N/4. In some aspects, a distance between the third sequence cyclic shift value associated with the high priority bit of "1" and the low priority bit of "1" and the fourth sequence cyclic shift value associated with the high priority bit of "1" and the low priority bit of "0" may be set to less than N/4.

In some aspects, a distance between the first sequence cyclic shift value associated with the high priority bit of "0" and the low priority bit of "0" and the fourth sequence cyclic shift value associated with the high priority bit of "1" and the low priority bit of "0" may be set to larger than N/4. In some aspects, a distance between the second sequence cyclic shift value associated with the high priority bit of "0" and the low priority bit of "1" and the third sequence cyclic shift value associated with the high priority bit of "1" and the low priority bit of "1" may be set to larger than N/4.

In the example shown in FIG. 5, when the two-bit HARQ-ACK value is equal to {0,0}, the cyclic shift applied to the sequence may be equal to 0. When the two-bit HARQ-ACK value is equal to {0,1}, the cyclic shift applied to the sequence may be equal to 2. When the two-bit HARQ-ACK value is equal to {1,1}, the cyclic shift applied to the sequence may be equal to 6. When the two-bit HARQ-ACK value is equal to {1,0} the cyclic shift applied to the sequence may be equal to 8.

In this example, depending on the two-bit HARQ-ACK value, the cyclic shift applied to the sequence may be equal to 0, 2, 6, or 8. For example, a distance between the cyclic shift equal to 0 and the cyclic shift equal to 2 is two, and a distance between the cyclic shift equal to 2 and the cyclic shift equal to 6 is four. In another example, depending on the two-bit HARQ-ACK value, the cyclic shift applied to the sequence may be equal to 0, 1, 6, or 7.

In some aspects, an unequal distance between some pairs of cyclic shift values may correspond to unequal reliability between the first HARQ-ACK bit associated with the high priority and the second HARQ-ACK bit associated with the low priority. In other words, a reliability of the first HARQ-ACK bit may be greater than a reliability of the second HARQ-ACK bit, which may be appropriate since the first HARQ-ACK bit is associated with the high priority and the second HARQ-ACK bit is associated with the low priority.

In some aspects, the relationship between the unequal distance between some pairs of cyclic shift values and the unequal reliability between HARQ-ACK bits may be based at least in part on a decoding error likelihood at a base station. When possible cyclic shift values corresponding to HARQ-ACK values (e.g., {0,0}, {0,1}, {1,1}, or {1,0}) are spaced unequally apart, a likelihood that the base station decodes a HARQ-ACK value in error (e.g., due to a noisy channel) may be unequal to a likelihood of decoding errors associated with other HARQ-ACK values. In other words, due to the unequal spacing between some cyclic shift values, a likelihood of successfully decoding the first HARQ-ACK bit associated with the high priority may be different than a likelihood of successfully decoding the second HARQ-ACK bit associated with the low priority.

As an example, with respect to a cyclic shift value of 0 corresponding to a HARQ-ACK value of {0,0} and a cyclic shift value of 2 corresponding to a HARQ-ACK value of {0,1}, a decoding error (e.g., due to noise) may cause the base station to improperly apply the cyclic shift value of 0 instead of the cyclic shift value of 2, or vice versa. However, in both cases, the first HARQ-ACK bit associated with the high priority is {0}, so an improper cyclic shift value may not affect the decoded value associated with the first HARQ-ACK bit. The second HARQ-ACK bit associated with the low priority may be {0} or {1}, depending on the cyclic shift value, and a distance of two between cyclic shift values may provide less reliability for the second HARQ-ACK bit associated with the low priority, as compared to a distance of three between cyclic shift values.

As another example, with respect to a cyclic shift value of 2 corresponding to a HARQ-ACK value of {0,1} and a cyclic shift value of 6 corresponding to a HARQ-ACK value of {1,1}, a decoding error (e.g., due to noise) may cause the base station to improperly apply the cyclic shift value of 2 instead of the cyclic shift value of 6, or vice versa. However, in both cases, the second HARQ-ACK bit associated with the low priority is {1}, so an improper cyclic shift value may not affect the decoded value associated with the second HARQ-ACK bit. The first HARQ-ACK bit associated with the high priority may be {0} or {1}, depending on the cyclic shift value, and a distance of four between cyclic shift values may provide more reliability for the first HARQ-ACK bit associated with the high priority, as compared to a distance of three between cyclic shift values. In other words, due to the distance of four between cyclic shift values, the base station may be less likely to incorrectly decode (e.g., interpret a {0} as a {1}, or vice versa) the first HARQ-ACK bit associated with the high priority, thereby improving the reliability of the first HARQ-ACK bit.

In some aspects, a common cyclic shift offset may be applied to a cyclic shift value corresponding to a HARQ-ACK value. The common cyclic shift offset may be initially applied to the cyclic shift value to rotate the cyclic shift value by the common cyclic shift offset.

In the example shown in FIG. 5, a common cyclic shift offset (e.g., 1) may be applied to the cyclic shift value of 0 corresponding to the two-bit HARQ-ACK value of {0,0}, which would result in the cyclic shift value being 1. The common cyclic shift offset (e.g., 1) may be applied to the cyclic shift value of 2 corresponding to the two-bit HARQ-ACK value of {0,1}, which would result in the cyclic shift value being 3. The common cyclic shift offset (e.g., 1) may be applied to the cyclic shift value of 6 corresponding to the two-bit HARQ-ACK value of {1,1}, which would result in the cyclic shift value being 7. The common cyclic shift offset (e.g., 1) may be applied to the cyclic shift value of 8 corresponding to the two-bit HARQ-ACK value of {1,0}, which would result in the cyclic shift value being 9.

As indicated above, FIG. 5 is provided as an example. Other examples may differ from what is described with regard to FIG. 5.

Figure 6:
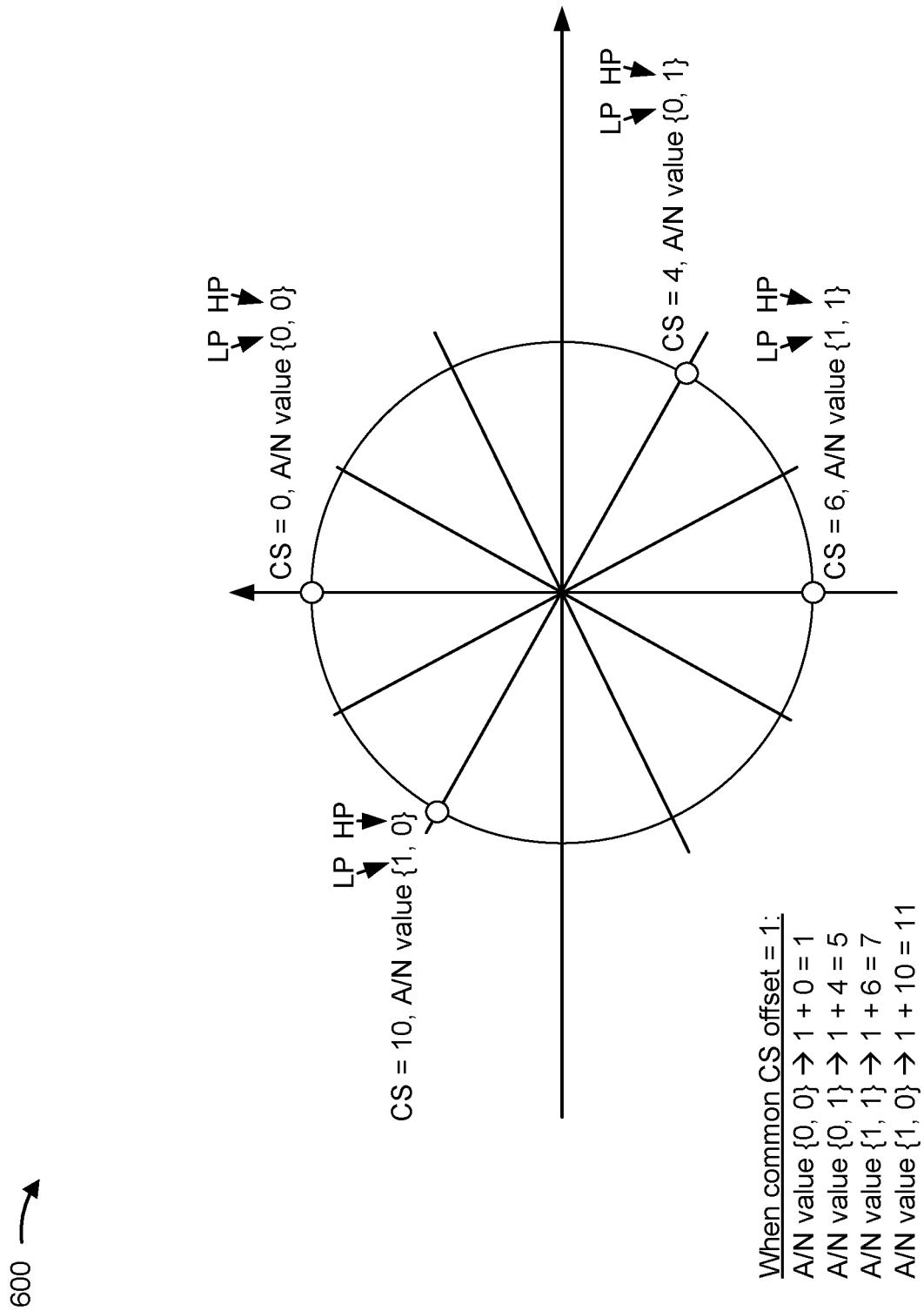

FIG. 6 is a diagram illustrating an example 600 associated with priority-based HARQ-ACK feedback, in accordance with various aspects of the present disclosure.

A UE (e.g., UE 120) may transmit, to a base station (e.g., base station 110), HARQ-ACK feedback including a two-bit HARQ-ACK value on a PUCCH format 0. The two-bit HARQ-ACK value may include a first HARQ-ACK bit associated with a low priority and a second HARQ-ACK bit associated with a high priority. The first HARQ-ACK bit associated with the low priority may correspond to an MSB, and the second HARQ-ACK bit associated with the high priority may correspond to an LSB.

The HARQ-ACK feedback may be transmitted via the PUCCH format 0 using a sequence with a cyclic shift in a time domain. The cyclic shift may be based at least in part on information bits associated with the HARQ-ACK feedback.

In some aspects, the HARQ-ACK feedback may be a first HARQ-ACK value that includes a low priority bit of {0} and a high priority bit of {0}, and the first HARQ-ACK value may be associated with a first sequence cyclic shift value. The HARQ-ACK feedback may be a second HARQ-ACK value that includes a low priority bit of {0} and a high priority bit of {1}, and the second HARQ-ACK value may be associated with a second sequence cyclic shift value. The HARQ-ACK feedback may be a third HARQ-ACK value that includes a low priority bit of {1} and a high priority bit of {1}, and the third HARQ-ACK value may be associated with a third sequence cyclic shift value. The HARQ-ACK feedback may be a fourth HARQ-ACK value that includes a low priority bit of {1} and a high priority bit of {0}, and the fourth HARQ-ACK value may be associated with a fourth sequence cyclic shift value.

In some aspects, a distance between the first sequence cyclic shift value associated with the high priority bit of "0" and the third sequence cyclic shift value associated with the high priority bit of "1" may be set to N/2 to reduce a decoding error likelihood of the first HARQ-ACK bit associated with the high priority at the base station. In some aspects, a distance between the second sequence cyclic shift value associated with the high priority bit of "1" and the fourth sequence cyclic shift value associated with the high priority bit of "0" may be set to N/2 to reduce a decoding error likelihood of the first HARQ-ACK bit associated with the high priority at the base station.

In some aspects, a distance between the first sequence cyclic shift value associated with the high priority bit of "0" and the low priority bit of "0" and the second sequence cyclic shift value associated with the high priority bit of "1" and the low priority bit of "0" may be set to less than N/4. In some aspects, a distance between the third sequence cyclic shift value associated with the high priority bit of "1" and the low priority bit of "1" and the fourth sequence cyclic shift value associated with the high priority bit of "0" and the low priority bit of "1" may be set to less than N/4.

In some aspects, a distance between the first sequence cyclic shift value associated with the high priority bit of "0" and the low priority bit of "0" and the fourth sequence cyclic shift value associated with the high priority bit of "0" and the low priority bit of "1" may be set to larger than N/4. In some aspects, a distance between the second sequence cyclic shift value associated with the high priority bit of "1" and the low priority bit of "0" and the third sequence cyclic shift value associated with the high priority bit of "1" and the low priority bit of "1" may be set to larger than N/4.

In the example shown in FIG. 6, when the two-bit HARQ-ACK value is equal to {0,0} (e.g., the first HARQ-ACK bit associated with the low priority is equal to {0}, and the second HARQ-ACK bit associated with the high priority is equal to {1}), the cyclic shift applied to the sequence may be equal to 0. When the two-bit HARQ-ACK value is equal to {0,1} (e.g., the first HARQ-ACK bit associated with the low priority is equal to {0}, and the second HARQ-ACK bit associated with the high priority is equal to {1}), the cyclic shift applied to the sequence may be equal to 4. When the two-bit HARQ-ACK value is equal to {1,1} (e.g., the first HARQ-ACK bit associated with the low priority is equal to {1}, and the second HARQ-ACK bit associated with the high priority is equal to {1}), the cyclic shift applied to the sequence may be equal to 6. When the two-bit HARQ-ACK value is equal to {1,0} (e.g., the first HARQ-ACK bit associated with the low priority is equal to {1}, and the second HARQ-ACK bit associated with the high priority is equal to {0}), the cyclic shift applied to the sequence may be equal to 10.

In the example shown in FIG. 6, a common cyclic shift offset (e.g., 1) may be applied to the cyclic shift value of 0 corresponding to the two-bit HARQ-ACK value of {0,0}, which would result in the cyclic shift value being 1. The common cyclic shift offset (e.g., 1) may be applied to the cyclic shift value of 4 corresponding to the two-bit HARQ-ACK value of {0,1}, which would result in the cyclic shift value being 5. The common cyclic shift offset (e.g., 1) may be applied to the cyclic shift value of 6 corresponding to the two-bit HARQ-ACK value of {1,1}, which would result in the cyclic shift value being 7. The common cyclic shift offset (e.g., 1) may be applied to the cyclic shift value of 10 corresponding to the two-bit HARQ-ACK value of {1,0}, which would result in the cyclic shift value being 11.

As indicated above, FIG. 6 is provided as an example. Other examples may differ from what is described with regard to FIG. 6.

Figure 7:
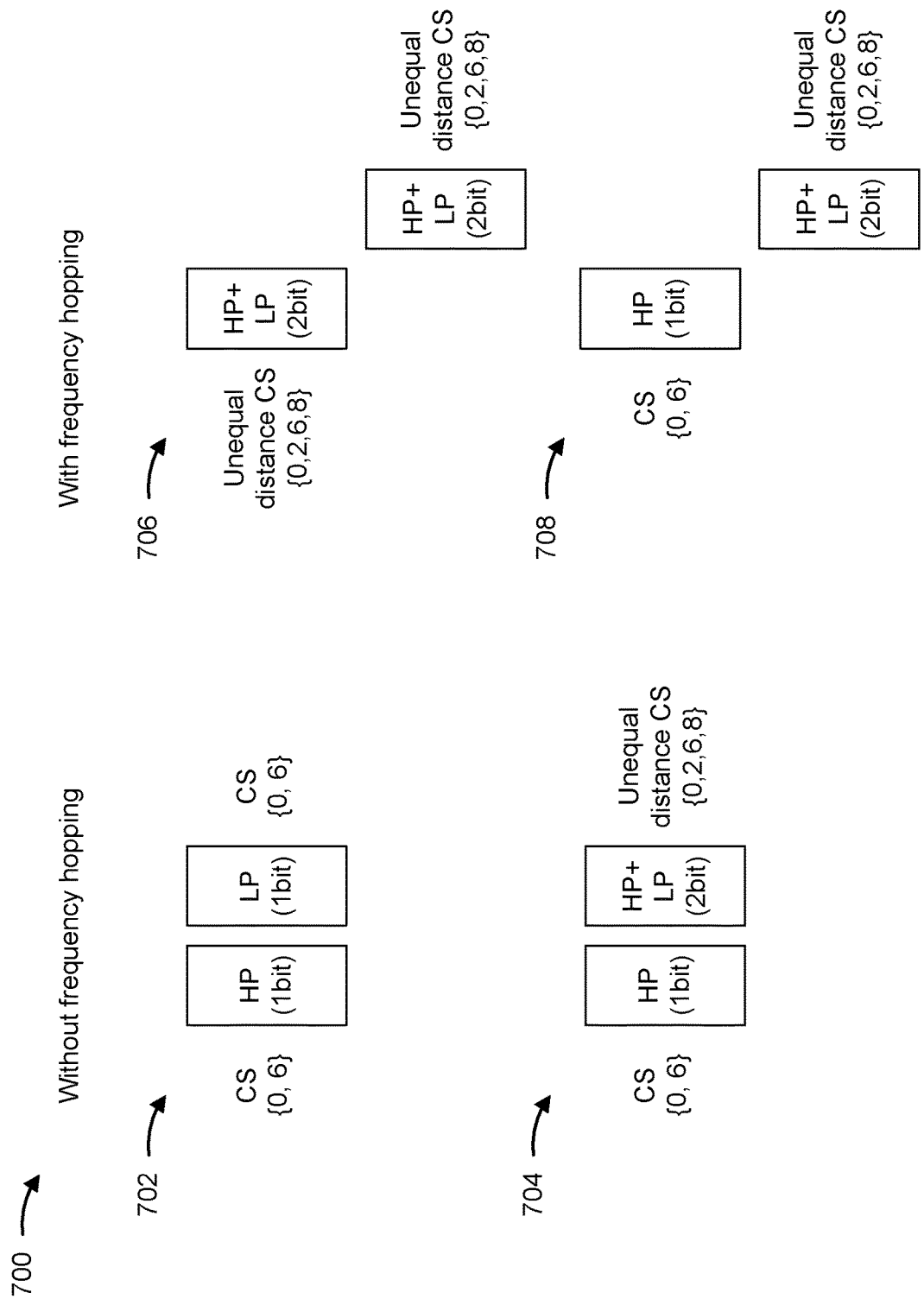

FIG. 7 is a diagram illustrating an example 700 associated with priority-based HARQ-ACK feedback, in accordance with various aspects of the present disclosure.

As shown by reference number 702, a UE may transmit, to a base station, HARQ-ACK feedback via a PUCCH format 0 without frequency hopping. The HARQ-ACK feedback may include a first HARQ-ACK bit associated with a high priority and a second HARQ-ACK bit associated with a low priority. The UE may transmit the first HARQ-ACK bit associated with the high priority using a first symbol. The UE may transmit the second HARQ-ACK bit associated with the low priority using a second symbol. The first and second symbols may be OFDM symbols. The first HARQ-ACK bit may be one bit, and the second HARQ-ACK bit may be one bit. As an example, the first HARQ-ACK bit may be associated with a cyclic shift value selected from {0,6}, and the second HARQ-ACK bit may be associated with a cyclic shift value selected from {0,6}.

As shown by reference number 704, a UE may transmit, to the base station, HARQ-ACK feedback via the PUCCH format 0 without frequency hopping. The HARQ-ACK feedback may include a first HARQ-ACK bit associated with a high priority and a second HARQ-ACK bit associated with a low priority. The UE may transmit the first HARQ-ACK bit associated with the high priority using a first symbol, which may occupy one bit. The UE may transmit the first HARQ-ACK bit associated with the high priority and the second HARQ-ACK bit associated with the low priority using a second symbol, which may occupy two bits. As an example, the first HARQ-ACK bit transmitted using the first symbol may be associated with a cyclic shift value selected from {0,6}. As another example, the first HARQ-ACK bit and the second HARQ-ACK bit transmitted using the second symbol may be associated with a cyclic shift value selected from {0,2,6,8} or {0,1,6,7}, which may correspond to unequal distances between some pairs of cyclic shift values.

As shown by reference number 706, a UE may transmit, to the base station, HARQ-ACK feedback via the PUCCH format 0 with frequency hopping. The HARQ-ACK feedback may include a first HARQ-ACK bit associated with a high priority and a second HARQ-ACK bit associated with a low priority. The UE may transmit the first HARQ-ACK bit associated with the high priority and the second HARQ-ACK bit associated with the low priority using a first symbol, which may occupy two bits. The UE may transmit the first HARQ-ACK bit and the second HARQ-ACK bit using a first frequency band. As an example, the first HARQ-ACK bit and the second HARQ-ACK bit transmitted using the first symbol may be associated with a cyclic shift value selected from {0,2,6,8} or {0,1,6,7}, which may correspond to unequal distances between some pairs of cyclic shift values.

Further, the UE may transmit the first HARQ-ACK bit associated with the high priority and the second HARQ-ACK bit associated with the low priority using a second symbol, which may occupy two bits. The UE may transmit the first HARQ-ACK bit and the second HARQ-ACK bit using a second frequency band. As an example, the first HARQ-ACK bit and the second HARQ-ACK bit transmitted using the second symbol may be associated with a cyclic shift value selected from {0,2,6,8} or {0,1,6,7}, which may correspond to unequal distances between some pairs of cyclic shift values.

As shown by reference number 708, a UE may transmit, to the base station, HARQ-ACK feedback via the PUCCH format 0 with frequency hopping. The HARQ-ACK feedback may include a first HARQ-ACK bit associated with a high priority and a second HARQ-ACK bit associated with a low priority. The UE may transmit the first HARQ-ACK bit associated with the high priority using a first symbol, which may occupy one bit. The UE may transmit the first HARQ-ACK bit using a first frequency band. As an example, the first HARQ-ACK bit transmitted using the first symbol may be associated with a cyclic shift value selected from {0,6}.

Further, the UE may transmit the first HARQ-ACK bit associated with the high priority and the second HARQ-ACK bit associated with the low priority using a second symbol, which may occupy two bits. The UE may transmit the first HARQ-ACK bit and the second HARQ-ACK bit using a second frequency band. As an example, the first HARQ-ACK bit and the second HARQ-ACK bit transmitted using the second symbol may be associated with a cyclic shift value selected from {0,2,6,8} or {0,1,6,7}, which may correspond to unequal distances between some pairs of cyclic shift values.

As indicated above, FIG. 7 is provided as an example. Other examples may differ from what is described with regard to FIG. 7.

Figure 8:
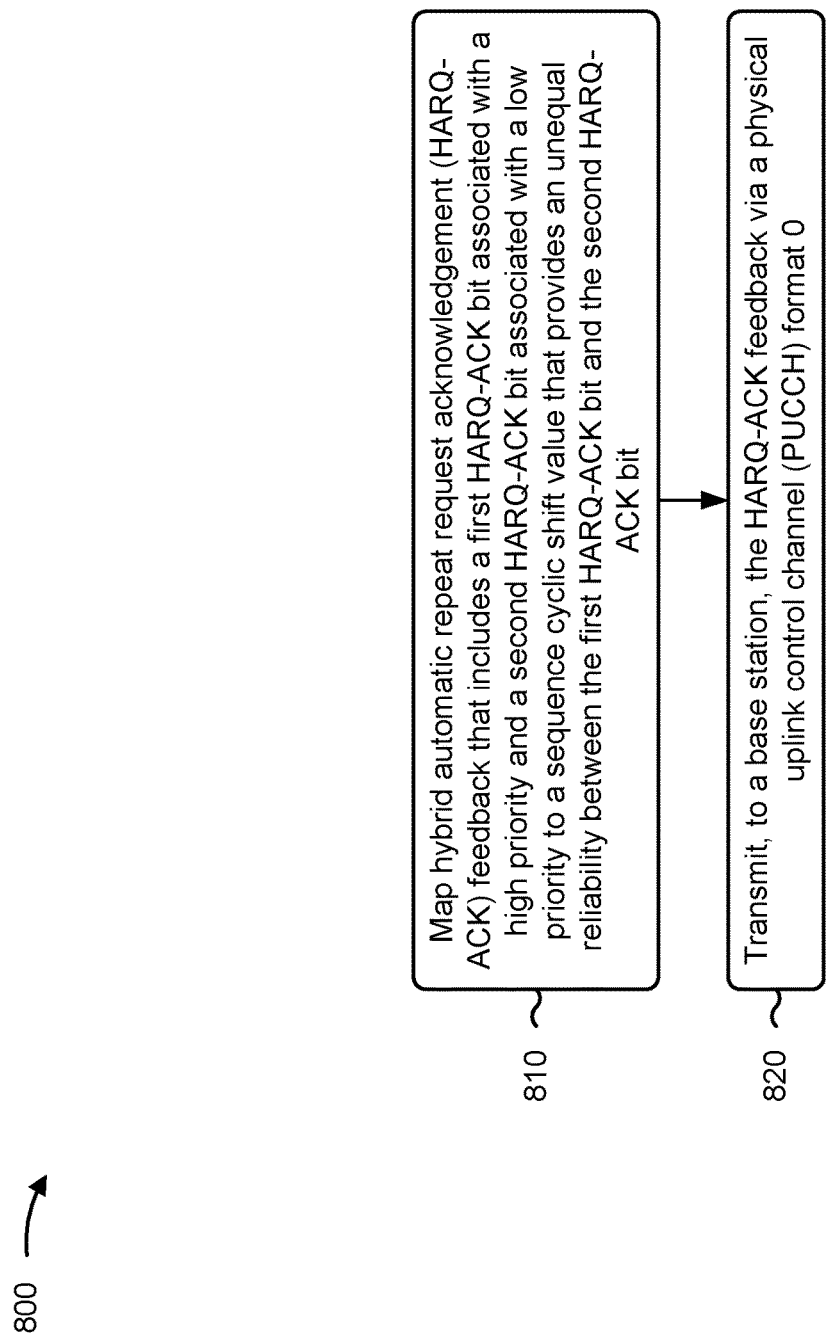
FIGS. 8-9 are diagrams illustrating example processes associated with priority-based HARQ-ACK feedback, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with priority-based HARQ-ACK feedback.

As shown in FIG. 8, in some aspects, process 800 may include mapping HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit (block 810). For example, the UE (e.g., using mapping component 1008, depicted in FIG. 10) may map HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit, as described above.

As further shown in FIG. 8, in some aspects, process 800 may include transmitting, to a base station, the HARQ-ACK feedback via a PUCCH format 0 (block 820). For example, the UE (e.g., using transmission component 1004, depicted in FIG. 10) may transmit, to a base station, the HARQ-ACK feedback via a PUCCH format 0, as described above.

Process 800 may include additional aspects, such as any single aspect or any combination of aspects described below and/or in connection with one or more other processes described elsewhere herein.

In a first aspect, the HARQ-ACK feedback is a first HARQ-ACK value that includes a high priority bit of {0} and a low priority bit of {0}, and the first HARQ-ACK value is associated with a first sequence cyclic shift value; the HARQ-ACK feedback is a second HARQ-ACK value that includes a high priority bit of {0} and a low priority bit of {1}, and the second HARQ-ACK value is associated with a second sequence cyclic shift value; the HARQ-ACK feedback is a third HARQ-ACK value that includes a high priority bit of {1} and a low priority bit of {1}, and the third HARQ-ACK value is associated with a third sequence cyclic shift value; or the HARQ-ACK feedback is a fourth HARQ-ACK value that includes a high priority bit of {1} and a low priority bit of {0}, and the fourth HARQ-ACK value is associated with a fourth sequence cyclic shift value.

In a second aspect, alone or in combination with the first aspect, a distance between the first sequence cyclic shift value associated with the high priority bit of {0} and the third sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

In a third aspect, alone or in combination with one or more of the first and second aspects, a distance between the second sequence cyclic shift value associated with the high priority bit of {0} and the fourth sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

In a fourth aspect, alone or in combination with one or more of the first through third aspects, a distance between the first sequence cyclic shift value associated with the high priority bit of {0} and the low priority bit of {0}, and the second sequence cyclic shift value associated with the high priority bit of {0} and the low priority bit of {1}, is set to less than N/4, where N is a total number of available cyclic shift values associated with a sequence used to transmit the PUCCH format 0.

In a fifth aspect, alone or in combination with one or more of the first through fourth aspects, a distance between the third sequence cyclic shift value associated with the high priority bit of {1} and the low priority bit of {1} and the fourth sequence cyclic shift value associated with the high priority bit of {1} and the low priority bit of {0} is set to less than N/4, where N is a total number of available cyclic shift values associated with a sequence used to transmit the PUCCH format 0.

In a sixth aspect, alone or in combination with one or more of the first through fifth aspects, a distance between the first sequence cyclic shift value associated with the high priority bit of {0} and the low priority bit of {0}, and the fourth sequence cyclic shift value associated with the high priority bit of {1} and the low priority bit of {0}, is set to larger than N/4, where N is a total number of available cyclic shift values associated with a sequence used to transmit the PUCCH format 0.

In a seventh aspect, alone or in combination with one or more of the first through sixth aspects, a distance between the second sequence cyclic shift value associated with the high priority bit of {0} and the low priority bit of {1}, and the third sequence cyclic shift value associated with the high priority bit of {1} and the low priority bit of {1}, is set to larger than N/4, where N is a total number of available cyclic shift values associated with a sequence used to transmit the PUCCH format 0.

In an eighth aspect, alone or in combination with one or more of the first through seventh aspects, the first HARQ-ACK bit corresponds to a most significant bit and the second HARQ-ACK bit corresponds to a least significant bit.

In a ninth aspect, alone or in combination with one or more of the first through eighth aspects, the first HARQ-ACK bit corresponds to a least significant bit and the second HARQ-ACK bit corresponds to a most significant bit.

In a tenth aspect, alone or in combination with one or more of the first through ninth aspects, transmitting the HARQ-ACK feedback via the PUCCH format 0 comprises transmitting, without frequency hopping, the first HARQ-ACK bit associated with the high priority using a first symbol and transmitting the second HARQ-ACK bit associated with the low priority using a second symbol.

In an eleventh aspect, alone or in combination with one or more of the first through tenth aspects, transmitting the HARQ-ACK feedback via the PUCCH format 0 comprises transmitting, without frequency hopping, the first HARQ-ACK bit associated with the high priority using a first symbol and transmitting the first HARQ-ACK bit associated with the high priority and the second HARQ-ACK bit associated with the low priority using a second symbol.

In a twelfth aspect, alone or in combination with one or more of the first through eleventh aspects, transmitting the HARQ-ACK feedback via the PUCCH format 0 comprises transmitting the HARQ-ACK feedback using frequency hopping, transmitting the first HARQ-ACK bit associated with the high priority and the second HARQ-ACK bit associated with the low priority using a first symbol, and transmitting the first HARQ-ACK bit associated with the high priority and the second HARQ-ACK bit associated with the low priority using a second symbol.

In a thirteenth aspect, alone or in combination with one or more of the first through twelfth aspects, transmitting the HARQ-ACK feedback via the PUCCH format 0 comprises transmitting the HARQ-ACK feedback using frequency hopping, transmitting the first HARQ-ACK bit associated with the high priority using a first symbol, and transmitting the first HARQ-ACK bit associated with the high priority and the second HARQ-ACK bit associated with the low priority using a second symbol.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
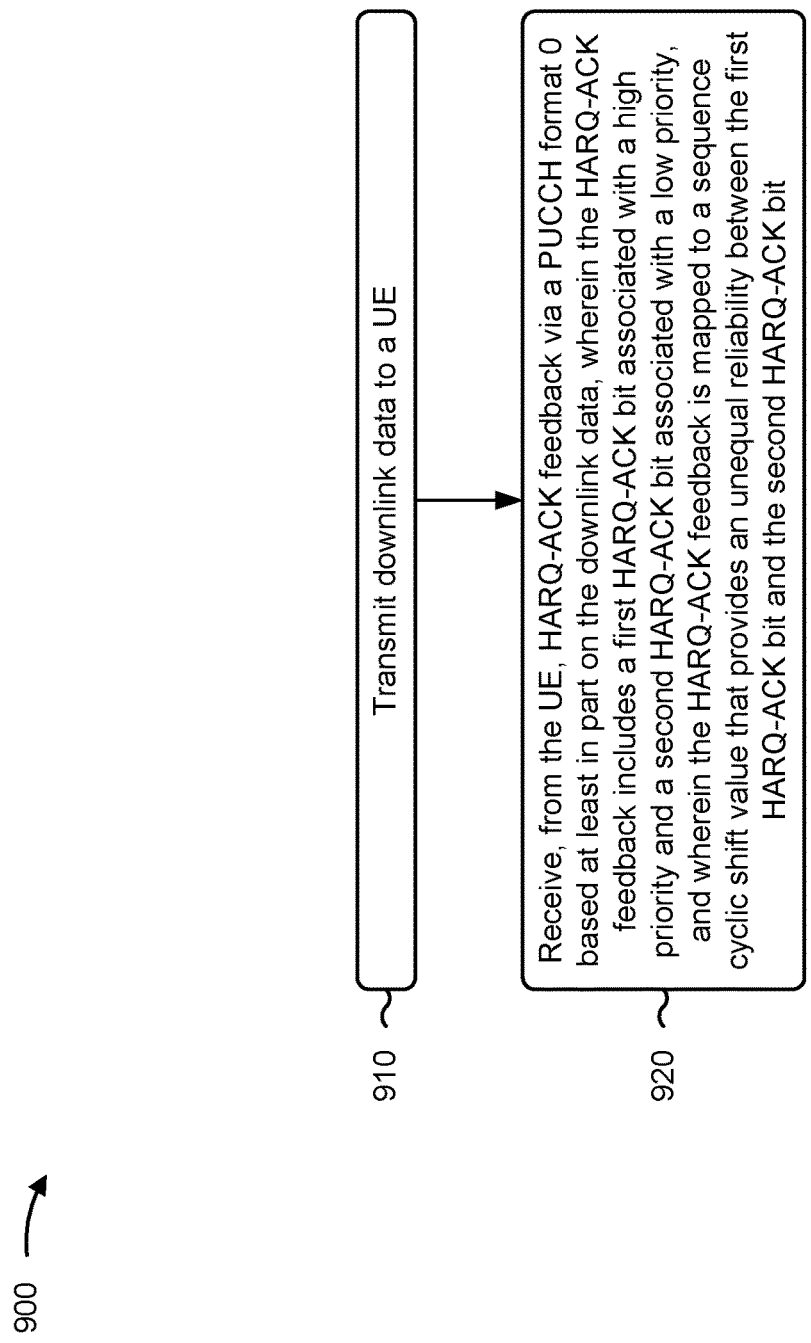

FIG. 9 is a diagram illustrating an example process 900 performed, for example, by a base station, in accordance with various aspects of the present disclosure. Example process 900 is an example where the base station (e.g., base station 110) performs operations associated with priority-based HARQ-ACK feedback.

As shown in FIG. 9, in some aspects, process 900 may include transmitting downlink data to a UE (block 910). For example, the base station (e.g., using transmission component 1104, depicted in FIG. 11) may transmit downlink data to a UE, as described above.

As further shown in FIG. 9, in some aspects, process 900 may include receiving, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit (block 920). For example, the base station (e.g., using reception component 1102, depicted in FIG. 11) may receive, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit, as described above.

Process 900 may include additional aspects, such as any single aspect or any combination of aspects described below and/or in connection with one or more other processes described elsewhere herein.

In a first aspect, the HARQ-ACK feedback is a first HARQ-ACK value that includes a high priority bit of {0} and a low priority bit of {0}, and the first HARQ-ACK value is associated with a first sequence cyclic shift value; the HARQ-ACK feedback is a second HARQ-ACK value that includes a high priority bit of {0} and a low priority bit of {1}, and the second HARQ-ACK value is associated with a second sequence cyclic shift value; the HARQ-ACK feedback is a third HARQ-ACK value that includes a high priority bit of {1} and a low priority bit of {1}, and the third HARQ-ACK value is associated with a third sequence cyclic shift value; or the HARQ-ACK feedback is a fourth HARQ-ACK value that includes a high priority bit of {1} and a low priority bit of {0}, and the fourth HARQ-ACK value is associated with a fourth sequence cyclic shift value.

In a second aspect, alone or in combination with the first aspect, a distance between the first sequence cyclic shift value associated with the high priority bit of {0} and the third sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

In a third aspect, alone or in combination with one or more of the first and second aspects, a distance between the second sequence cyclic shift value associated with the high priority bit of {0} and the fourth sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

In a fourth aspect, alone or in combination with one or more of the first through third aspects, a distance between the first sequence cyclic shift value associated with the high priority bit of {0} and the low priority bit of {0}, and the second sequence cyclic shift value associated with the high priority bit of {0} and the low priority bit of {1}, is set to less than N/4, where N is a total number of available cyclic shift values associated with a sequence used to transmit the PUCCH format 0.

In a fifth aspect, alone or in combination with one or more of the first through fourth aspects, a distance between the third sequence cyclic shift value associated with the high priority bit of {1} and the low priority bit of {1}, and the fourth sequence cyclic shift value associated with the high priority bit of {1} and the low priority bit of {0}, is set to less than N/4, where N is a total number of available cyclic shift values associated with a sequence used to transmit the PUCCH format 0.

In a sixth aspect, alone or in combination with one or more of the first through fifth aspects, a distance between the first sequence cyclic shift value associated with the high priority bit of {0} and the low priority bit of {0}, and the fourth sequence cyclic shift value associated with the high priority bit of {1} and the low priority bit of {0}, is set to larger than N/4, where N is a total number of available cyclic shift values associated with a sequence used to transmit the PUCCH format 0.

In a seventh aspect, alone or in combination with one or more of the first through sixth aspects, a distance between the second sequence cyclic shift value associated with the high priority bit of {0} and the low priority bit of {1}, and the third sequence cyclic shift value associated with the high priority bit of {1} and the low priority bit of {1}, is set to larger than N/4, where N is a total number of available cyclic shift values associated with a sequence used to transmit the PUCCH format 0.

In an eighth aspect, alone or in combination with one or more of the first through seventh aspects, the first HARQ-ACK bit corresponds to a most significant bit and the second HARQ-ACK bit corresponds to a least significant bit.

In a ninth aspect, alone or in combination with one or more of the first through eighth aspects, the first HARQ-ACK bit corresponds to a least significant bit and the second HARQ-ACK bit corresponds to a most significant bit.

In a tenth aspect, alone or in combination with one or more of the first through ninth aspects, receiving the HARQ-ACK feedback via the PUCCH format 0 comprises receiving, without frequency hopping, the first HARQ-ACK bit associated with the high priority using a first symbol and receiving the second HARQ-ACK bit associated with the low priority using a second symbol.

In an eleventh aspect, alone or in combination with one or more of the first through tenth aspects, receiving the HARQ-ACK feedback via the PUCCH format 0 comprises receiving, without frequency hopping, the first HARQ-ACK bit associated with the high priority using a first symbol and receiving the first HARQ-ACK bit associated with the high priority and the second HARQ-ACK bit associated with the low priority using a second symbol.

In a twelfth aspect, alone or in combination with one or more of the first through eleventh aspects, receiving the HARQ-ACK feedback via the PUCCH format 0 comprises receiving the HARQ-ACK feedback using frequency hopping, receiving the first HARQ-ACK bit associated with the high priority and the second HARQ-ACK bit associated with the low priority using a first symbol, and receiving the first HARQ-ACK bit associated with the high priority and the second HARQ-ACK bit associated with the low priority using a second symbol.

In a thirteenth aspect, alone or in combination with one or more of the first through twelfth aspects, receiving the HARQ-ACK feedback via the PUCCH format 0 comprises receiving the HARQ-ACK feedback using frequency hopping, receiving the first HARQ-ACK bit associated with the high priority using a first symbol, and receiving the first HARQ-ACK bit associated with the high priority and the second HARQ-ACK bit associated with the low priority using a second symbol.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
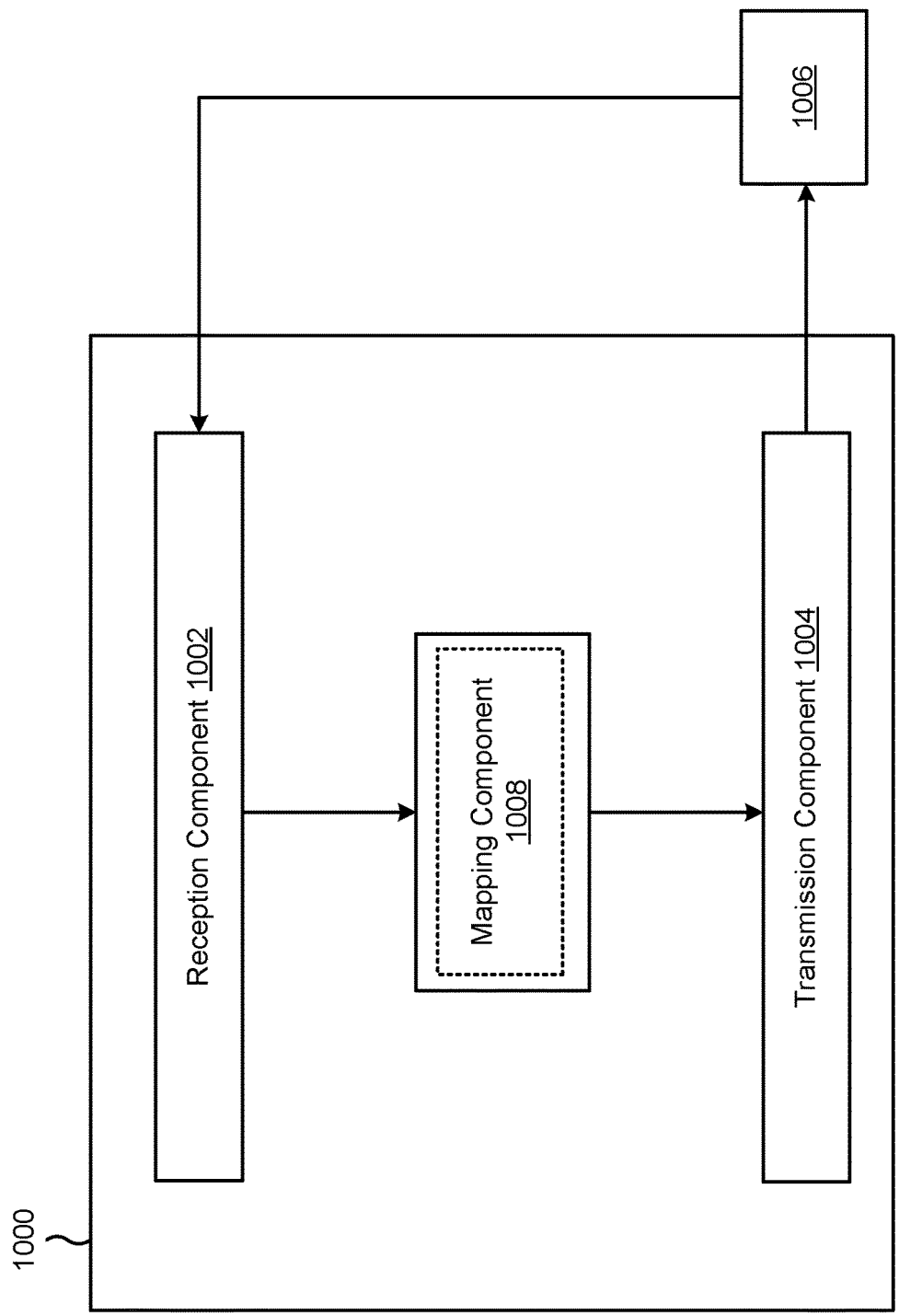
FIGS. 10-11 are block diagrams of example apparatuses for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a mapping component 1008, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The mapping component 1008 may map HARQ-ACK feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit. The transmission component 1004 may transmit, to a base station, the HARQ-ACK feedback via a PUCCH format 0.

The transmission component 1004 may transmit, without frequency hopping, the first HARQ-ACK bit associated with the high priority using a first symbol and transmit the second HARQ-ACK bit associated with the low priority using a second symbol.

The transmission component 1004 may transmit, without frequency hopping, the first HARQ-ACK bit associated with the high priority using a first symbol and transmit the first HARQ-ACK bit associated with the high priority and the second HARQ-ACK bit associated with the low priority using a second symbol.

The transmission component 1004 may transmit the HARQ-ACK feedback using frequency hopping. The transmission component 1004 may transmit the first HARQ-ACK bit associated with the high priority and the second HARQ-ACK bit associated with the low priority using a first symbol. The transmission component 1004 may transmit the first HARQ-ACK bit associated with the high priority and the second HARQ-ACK bit associated with the low priority using a second symbol.

The transmission component 1004 may transmit the HARQ-ACK feedback using frequency hopping. The transmission component 1004 may transmit the first HARQ-ACK bit associated with the high priority using a first symbol. The transmission component 1004 may transmit the first HARQ-ACK bit associated with the high priority and the second HARQ-ACK bit associated with the low priority using a second symbol.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
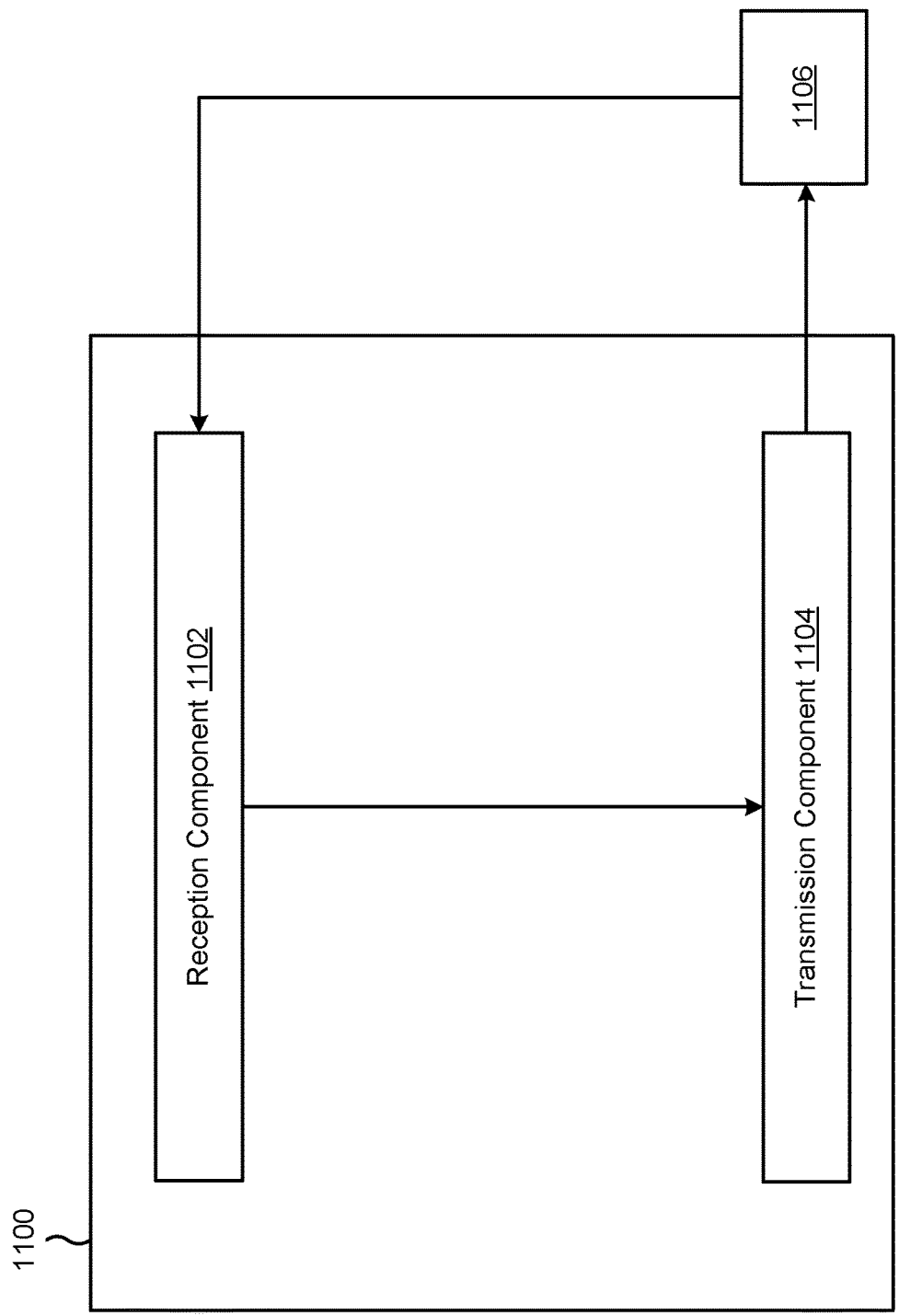

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit downlink data to a UE. The reception component 1102 may receive, from the UE, HARQ-ACK feedback via a PUCCH format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

The reception component 1102 may receive, without frequency hopping, the first HARQ-ACK bit associated with the high priority using a first symbol and receive the second HARQ-ACK bit associated with the low priority using a second symbol.

The reception component 1102 may receive, without frequency hopping, the first HARQ-ACK bit associated with the high priority using a first symbol and receive the first HARQ-ACK bit associated with the high priority and the second HARQ-ACK bit associated with the low priority using a second symbol.

The reception component 1102 may receive the HARQ-ACK feedback using frequency hopping. The reception component 1102 may receive the first HARQ-ACK bit associated with the high priority and the second HARQ-ACK bit associated with the low priority using a first symbol. The reception component 1102 may receive the first HARQ-ACK bit associated with the high priority and the second HARQ-ACK bit associated with the low priority using a second symbol.

The reception component 1102 may receive the HARQ-ACK feedback using frequency hopping. The reception component 1102 may receive the first HARQ-ACK bit associated with the high priority using a first symbol. The reception component 1102 may receive the first HARQ-ACK bit associated with the high priority and the second HARQ-ACK bit associated with the low priority using a second symbol.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of aspects of the present disclosure:

Aspect 1: A method of wireless communication performed by a user equipment (UE), comprising: mapping hybrid automatic repeat request acknowledgement (HARQ-ACK) feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and transmitting, to a base station, the HARQ-ACK feedback via a physical uplink control channel (PUCCH) format 0.

Aspect 2: The method of aspect 1, wherein: the HARQ-ACK feedback is a first HARQ-ACK value that includes a high priority bit of {0} and a low priority bit of {0}, and the first HARQ-ACK value is associated with a first sequence cyclic shift value; the HARQ-ACK feedback is a second HARQ-ACK value that includes a high priority bit of {0} and a low priority bit of {1}, and the second HARQ-ACK value is associated with a second sequence cyclic shift value; the HARQ-ACK feedback is a third HARQ-ACK value that includes a high priority bit of {1} and a low priority bit of {1}, and the third HARQ-ACK value is associated with a third sequence cyclic shift value; or the HARQ-ACK feedback is a fourth HARQ-ACK value that includes a high priority bit of {1} and a low priority bit of {0}, and the fourth HARQ-ACK value is associated with a fourth sequence cyclic shift value.

Aspect 3: The method of aspect 2, wherein a distance between the first sequence cyclic shift value associated with the high priority bit of {0} and the third sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

Aspect 4: The method of any of aspects 2 through 3, wherein a distance between the second sequence cyclic shift value associated with the high priority bit of {0} and the fourth sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

Aspect 5: The method of any of aspects 2 through 4, wherein a distance between the first sequence cyclic shift value associated with the high priority bit of {0} and the low priority bit of {0} and the second sequence cyclic shift value associated with the high priority bit of {0} and the low priority bit of {1} is set to less than N/4, where N is a total number of available cyclic shift values associated with a sequence used to transmit the PUCCH format 0.

Aspect 6: The method of any of aspects 2 through 5, wherein a distance between the third sequence cyclic shift value associated with the high priority bit of {1} and the low priority bit of {1} and the fourth sequence cyclic shift value associated with the high priority bit of {1} and the low priority bit of {0} is set to less than N/4, where N is a total number of available cyclic shift values associated with a sequence used to transmit the PUCCH format 0.

Aspect 7: The method of any of aspects 2 through 6, wherein a distance between the first sequence cyclic shift value associated with the high priority bit of {0} and the low priority bit of {0} and the fourth sequence cyclic shift value associated with the high priority bit of {1} and the low priority bit of {0} is set to larger than N/4, where N is a total number of available cyclic shift values associated with a sequence used to transmit the PUCCH format 0.

Aspect 8: The method of any of aspects 2 through 7, wherein a distance between the second sequence cyclic shift value associated with the high priority bit of {0} and the low priority bit of {1} and the third sequence cyclic shift value associated with the high priority bit of {1} and the low priority bit of {1} is set to larger than N/4, where N is a total number of available cyclic shift values associated with a sequence used to transmit the PUCCH format 0.

Aspect 9: The method of any of aspects 1 through 8, wherein the first HARQ-ACK bit corresponds to a most significant bit and the second HARQ-ACK bit corresponds to a least significant bit.

Aspect 10: The method of any of aspects 1 through 9, wherein the first HARQ-ACK bit corresponds to a least significant bit and the second HARQ-ACK bit corresponds to a most significant bit.

Aspect 11: The method of any of aspects 1 through 10, wherein transmitting the HARQ-ACK feedback via the PUCCH format 0 comprises: transmitting, without frequency hopping, the first HARQ-ACK bit associated with the high priority using a first symbol and transmitting the second HARQ-ACK bit associated with the low priority using a second symbol.

Aspect 12: The method of any of aspects 1 through 11, wherein transmitting the HARQ-ACK feedback via the PUCCH format 0 comprises: transmitting, without frequency hopping, the first HARQ-ACK bit associated with the high priority using a first symbol and transmitting the first HARQ-ACK bit associated with the high priority and the second HARQ-ACK bit associated with the low priority using a second symbol.

Aspect 13: The method of any of aspects 1 through 12, wherein transmitting the HARQ-ACK feedback via the PUCCH format 0 comprises transmitting the HARQ-ACK feedback using frequency hopping, and: transmitting the first HARQ-ACK bit associated with the high priority and the second HARQ-ACK bit associated with the low priority using a first symbol, and transmitting the first HARQ-ACK bit associated with the high priority and the second HARQ-ACK bit associated with the low priority using a second symbol.

Aspect 14: The method of any of aspects 1 through 13, wherein transmitting the HARQ-ACK feedback via the PUCCH format 0 comprises transmitting the HARQ-ACK feedback using frequency hopping, and: transmitting the first HARQ-ACK bit associated with the high priority using a first symbol, and transmitting the first HARQ-ACK bit associated with the high priority and the second HARQ-ACK bit associated with the low priority using a second symbol.

Aspect 15: A method of wireless communication performed by a base station, comprising: transmitting downlink data to a user equipment (UE); and receiving, from the UE, hybrid automatic repeat request acknowledgement (HARQ-ACK) feedback via a physical uplink control channel (PUCCH) format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

Aspect 16: The method of aspect 15, wherein: the HARQ-ACK feedback is a first HARQ-ACK value that includes a high priority bit of {0} and a low priority bit of {0}, and the first HARQ-ACK value is associated with a first sequence cyclic shift value; the HARQ-ACK feedback is a second HARQ-ACK value that includes a high priority bit of {0} and a low priority bit of {1}, and the second HARQ-ACK value is associated with a second sequence cyclic shift value; the HARQ-ACK feedback is a third HARQ-ACK value that includes a high priority bit of {1} and a low priority bit of {1}, and the third HARQ-ACK value is associated with a third sequence cyclic shift value; or the HARQ-ACK feedback is a fourth HARQ-ACK value that includes a high priority bit of {1} and a low priority bit of {0}, and the fourth HARQ-ACK value is associated with a fourth sequence cyclic shift value.

Aspect 17: The method of aspect 16, wherein a distance between the first sequence cyclic shift value associated with the high priority bit of {0} and the third sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

Aspect 18: The method of any of aspects 16 through 17, wherein a distance between the second sequence cyclic shift value associated with the high priority bit of {0} and the fourth sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

Aspect 19: The method of any of aspects 16 through 18, wherein a distance between the first sequence cyclic shift value associated with the high priority bit of {0} and the low priority bit of {0} and the second sequence cyclic shift value associated with the high priority bit of {0} and the low priority bit of {1} is set to less than N/4, where N is a total number of available cyclic shift values associated with a sequence used to transmit the PUCCH format 0.

Aspect 20: The method of any of aspects 16 through 19, wherein a distance between the third sequence cyclic shift value associated with the high priority bit of {1} and the low priority bit of {1} and the fourth sequence cyclic shift value associated with the high priority bit of {1} and the low priority bit of {0} is set to less than N/4, where N is a total number of available cyclic shift values associated with a sequence used to transmit the PUCCH format 0.

Aspect 21: The method of any of aspects 16 through 20, wherein a distance between the first sequence cyclic shift value associated with the high priority bit of {0} and the low priority bit of {0} and the fourth sequence cyclic shift value associated with the high priority bit of {1} and the low priority bit of {0} is set to larger than N/4, where N is a total number of available cyclic shift values associated with a sequence used to transmit the PUCCH format 0.

Aspect 22: The method of any of aspects 16 through 21, wherein a distance between the second sequence cyclic shift value associated with the high priority bit of {0} and the low priority bit of {1} and the third sequence cyclic shift value associated with the high priority bit of {1} and the low priority bit of {1} is set to larger than N/4, where N is a total number of available cyclic shift values associated with a sequence used to transmit the PUCCH format 0.

Aspect 23: The method of any of aspects 15 through 22, wherein the first HARQ-ACK bit corresponds to a most significant bit and the second HARQ-ACK bit corresponds to a least significant bit.

Aspect 24: The method of any of aspects 15 through 23, wherein the first HARQ-ACK bit corresponds to a least significant bit and the second HARQ-ACK bit corresponds to a most significant bit.

Aspect 25: The method of any of aspects 15 through 24, wherein receiving the HARQ-ACK feedback via the PUCCH format 0 comprises: receiving, without frequency hopping, the first HARQ-ACK bit associated with the high priority using a first symbol and receiving the second HARQ-ACK bit associated with the low priority using a second symbol.

Aspect 26: The method of any of aspects 15 through 25, wherein receiving the HARQ-ACK feedback via the PUCCH format 0 comprises: receiving, without frequency hopping, the first HARQ-ACK bit associated with the high priority using a first symbol and receiving the first HARQ-ACK bit associated with the high priority and the second HARQ-ACK bit associated with the low priority using a second symbol.

Aspect 27: The method of any of aspects 15 through 26, wherein receiving the HARQ-ACK feedback via the PUCCH format 0 comprises receiving the HARQ-ACK feedback using frequency hopping, and: receiving the first HARQ-ACK bit associated with the high priority and the second HARQ-ACK bit associated with the low priority using a first symbol, and receiving the first HARQ-ACK bit associated with the high priority and the second HARQ-ACK bit associated with the low priority using a second symbol.

Aspect 28: The method of any of aspects 15 through 27, wherein receiving the HARQ-ACK feedback via the PUCCH format 0 comprises receiving the HARQ-ACK feedback using frequency hopping, and: receiving the first HARQ-ACK bit associated with the high priority using a first symbol, and receiving the first HARQ-ACK bit associated with the high priority and the second HARQ-ACK bit associated with the low priority using a second symbol.

Aspect 29: An apparatus for wireless communication at a device, comprising a processor; memory coupled with the processor; and instructions stored in the memory and executable by the processor to cause the apparatus to perform the method of one or more aspects of aspects 1-14.

Aspect 30: A device for wireless communication, comprising a memory and one or more processors coupled to the memory, the memory and the one or more processors configured to perform the method of one or more aspects of aspects 1-14.

Aspect 31: An apparatus for wireless communication, comprising at least one means for performing the method of one or more aspects of aspects 1-14.

Aspect 32: A non-transitory computer-readable medium storing code for wireless communication, the code comprising instructions executable by a processor to perform the method of one or more aspects of aspects 1-14.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-14.

Aspect 34: An apparatus for wireless communication at a device, comprising a processor; memory coupled with the processor; and instructions stored in the memory and executable by the processor to cause the apparatus to perform the method of one or more aspects of aspects 15-28.

Aspect 35: A device for wireless communication, comprising a memory and one or more processors coupled to the memory, the memory and the one or more processors configured to perform the method of one or more aspects of aspects 15-28.

Aspect 36: An apparatus for wireless communication, comprising at least one means for performing the method of one or more aspects of aspects 15-28.

Aspect 37: A non-transitory computer-readable medium storing code for wireless communication, the code comprising instructions executable by a processor to perform the method of one or more aspects of aspects 15-28.

Aspect 38: A non-transitory computer-readable medium storing a set of instructions for wireless communication, the set of instructions comprising one or more instructions that, when executed by one or more processors of a device, cause the device to perform the method of one or more aspects of aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   mapping hybrid automatic repeat request acknowledgement (HARQ-ACK) feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and
   transmitting, to a base station, the HARQ-ACK feedback via a physical uplink control channel (PUCCH) format 0.

2. The method of claim 1, wherein:
   the HARQ-ACK feedback is a first HARQ-ACK value that includes a high priority bit of {0} and a low priority bit of {0}, and the first HARQ-ACK value is associated with a first sequence cyclic shift value;
   the HARQ-ACK feedback is a second HARQ-ACK value that includes a high priority bit of {0} and a low priority bit of {1}, and the second HARQ-ACK value is associated with a second sequence cyclic shift value;
   the HARQ-ACK feedback is a third HARQ-ACK value that includes a high priority bit of {1} and a low priority bit of {1}, and the third HARQ-ACK value is associated with a third sequence cyclic shift value; or
   the HARQ-ACK feedback is a fourth HARQ-ACK value that includes a high priority bit of {1} and a low priority bit of {0}, and the fourth HARQ-ACK value is associated with a fourth sequence cyclic shift value.

3. The method of claim 2, wherein a distance between the first sequence cyclic shift value associated with the high priority bit of {0} and the third sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

4. The method of claim 2, wherein a distance between the second sequence cyclic shift value associated with the high priority bit of {0} and the fourth sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

5. The method of claim 2, wherein a distance between the first sequence cyclic shift value associated with the high priority bit of {0} and the low priority bit of {0} and the second sequence cyclic shift value associated with the high priority bit of {0} and the low priority bit of {1} is set to less than N/4, where N is a total number of available cyclic shift values associated with a sequence used to transmit the PUCCH format 0.

6. The method of claim 2, wherein a distance between the third sequence cyclic shift value associated with the high priority bit of {1} and the low priority bit of {1} and the fourth sequence cyclic shift value associated with the high priority bit of {1} and the low priority bit of {0} is set to less than N/4, where N is a total number of available cyclic shift values associated with a sequence used to transmit the PUCCH format 0.

7. The method of claim 2, wherein a distance between the first sequence cyclic shift value associated with the high priority bit of {0} and the low priority bit of {0} and the fourth sequence cyclic shift value associated with the high priority bit of {1} and the low priority bit of {0} is set to larger than N/4, where N is a total number of available cyclic shift values associated with a sequence used to transmit the PUCCH format 0.

8. The method of claim 2, wherein a distance between the second sequence cyclic shift value associated with the high priority bit of {0} and the low priority bit of {1} and the third sequence cyclic shift value associated with the high priority bit of {1} and the low priority bit of {1} is set to larger than N/4, where N is a total number of available cyclic shift values associated with a sequence used to transmit the PUCCH format 0.

9. The method of claim 1, wherein the first HARQ-ACK bit corresponds to a most significant bit and the second HARQ-ACK bit corresponds to a least significant bit.

10. The method of claim 1, wherein the first HARQ-ACK bit corresponds to a least significant bit and the second HARQ-ACK bit corresponds to a most significant bit.

11. The method of claim 1, wherein transmitting the HARQ-ACK feedback via the PUCCH format 0 comprises:
transmitting, without frequency hopping, the first HARQ-ACK bit associated with the high priority using a first symbol and transmitting the second HARQ-ACK bit associated with the low priority using a second symbol.

12. The method of claim 1, wherein transmitting the HARQ-ACK feedback via the PUCCH format 0 comprises:
transmitting, without frequency hopping, the first HARQ-ACK bit associated with the high priority using a first symbol and transmitting the first HARQ-ACK bit associated with the high priority and the second HARQ-ACK bit associated with the low priority using a second symbol.

13. The method of claim 1, wherein transmitting the HARQ-ACK feedback via the PUCCH format 0 comprises transmitting the HARQ-ACK feedback using frequency hopping, and:
transmitting the first HARQ-ACK bit associated with the high priority and the second HARQ-ACK bit associated with the low priority using a first symbol, and
transmitting the first HARQ-ACK bit associated with the high priority and the second HARQ-ACK bit associated with the low priority using a second symbol.

14. The method of claim 1, wherein transmitting the HARQ-ACK feedback via the PUCCH format 0 comprises transmitting the HARQ-ACK feedback using frequency hopping, and:
transmitting the first HARQ-ACK bit associated with the high priority using a first symbol, and
transmitting the first HARQ-ACK bit associated with the high priority and the second HARQ-ACK bit associated with the low priority using a second symbol.

15. A method of wireless communication performed by a base station, comprising:
transmitting downlink data to a user equipment (UE); and
receiving, from the UE, hybrid automatic repeat request acknowledgement (HARQ-ACK) feedback via a physical uplink control channel (PUCCH) format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

16. The method of claim 15, wherein:
the HARQ-ACK feedback is a first HARQ-ACK value that includes a high priority bit of {0} and a low priority bit of {0}, and the first HARQ-ACK value is associated with a first sequence cyclic shift value;
the HARQ-ACK feedback is a second HARQ-ACK value that includes a high priority bit of {0} and a low priority bit of {1}, and the second HARQ-ACK value is associated with a second sequence cyclic shift value;
the HARQ-ACK feedback is a third HARQ-ACK value that includes a high priority bit of {1} and a low priority bit of {1}, and the third HARQ-ACK value is associated with a third sequence cyclic shift value; or
the HARQ-ACK feedback is a fourth HARQ-ACK value that includes a high priority bit of {1} and a low priority bit of {0}, and the fourth HARQ-ACK value is associated with a fourth sequence cyclic shift value.

17. The method of claim 16, wherein a distance between the first sequence cyclic shift value associated with the high priority bit of {0} and the third sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

18. The method of claim 16, wherein a distance between the second sequence cyclic shift value associated with the high priority bit of {0} and the fourth sequence cyclic shift value associated with the high priority bit of {1} is set to N/2 to reduce a decoding error likelihood of the first HARQ-ACK bit associated with the high priority at the base station, where N is a total number of available cyclic shift values associated with a sequence used to transmit the PUCCH format 0.

19. The method of claim 16, wherein a distance between the first sequence cyclic shift value associated with the high priority bit of {0} and the low priority bit of {0} and the second sequence cyclic shift value associated with the high priority bit of {0} and the low priority bit of {1} is set to less than N/4, where N is a total number of available cyclic shift values associated with a sequence used to transmit the PUCCH format 0.

20. The method of claim 16, wherein a distance between the third sequence cyclic shift value associated with the high priority bit of {1} and the low priority bit of {1} and the fourth sequence cyclic shift value associated with the high priority bit of {1} and the low priority bit of {0} is set to less than N/4, where N is a total number of available cyclic shift values associated with a sequence used to transmit the PUCCH format 0.

21. The method of claim 16, wherein a distance between the first sequence cyclic shift value associated with the high priority bit of {0} and the low priority bit of {0} and the fourth sequence cyclic shift value associated with the high priority bit of {1} and the low priority bit of {0} is set to larger than N/4, where N is a total number of available cyclic shift values associated with a sequence used to transmit the PUCCH format 0.

22. The method of claim 16, wherein a distance between the second sequence cyclic shift value associated with the high priority bit of {0} and the low priority bit of {1} and the third sequence cyclic shift value associated with the high priority bit of {1} and the low priority bit of {1} is set to larger than N/4, where N is a total number of available cyclic shift values associated with a sequence used to transmit the PUCCH format 0.

23. The method of claim 15, wherein the first HARQ-ACK bit corresponds to a most significant bit and the second HARQ-ACK bit corresponds to a least significant bit.

24. The method of claim 15, wherein the first HARQ-ACK bit corresponds to a least significant bit and the second HARQ-ACK bit corresponds to a most significant bit.

25. The method of claim 15, wherein receiving the HARQ-ACK feedback via the PUCCH format 0 comprises:
receiving, without frequency hopping, the first HARQ-ACK bit associated with the high priority using a first symbol and receiving the second HARQ-ACK bit associated with the low priority using a second symbol.

26. The method of claim 15, wherein receiving the HARQ-ACK feedback via the PUCCH format 0 comprises:
receiving, without frequency hopping, the first HARQ-ACK bit associated with the high priority using a first symbol and receiving the first HARQ-ACK bit associated with the high priority and the second HARQ-ACK bit associated with the low priority using a second symbol.

27. The method of claim 15, wherein receiving the HARQ-ACK feedback via the PUCCH format 0 comprises receiving the HARQ-ACK feedback using frequency hopping, and:
    receiving the first HARQ-ACK bit associated with the high priority and the second HARQ-ACK bit associated with the low priority using a first symbol, and
    receiving the first HARQ-ACK bit associated with the high priority and the second HARQ-ACK bit associated with the low priority using a second symbol.

28. The method of claim 15, wherein receiving the HARQ-ACK feedback via the PUCCH format 0 comprises receiving the HARQ-ACK feedback using frequency hopping, and:
    receiving the first HARQ-ACK bit associated with the high priority using a first symbol, and
    receiving the first HARQ-ACK bit associated with the high priority and the second HARQ-ACK bit associated with the low priority using a second symbol.

29. A user equipment (UE) for wireless communication, comprising:
    a memory; and
    one or more processors operatively coupled to the memory, the memory and the one or more processors configured to:
        map hybrid automatic repeat request acknowledgement (HARQ-ACK) feedback that includes a first HARQ-ACK bit associated with a high priority and a second HARQ-ACK bit associated with a low priority to a sequence cyclic shift value that provides an unequal reliability between the first HARQ-ACK bit and the second HARQ-ACK bit; and
        transmit, to a base station, the HARQ-ACK feedback via a physical uplink control channel (PUCCH) format 0.

30. A base station for wireless communication, comprising:
    a memory; and
    one or more processors operatively coupled to the memory, the memory and the one or more processors configured to:
        transmit downlink data to a user equipment (UE); and
        receive, from the UE, hybrid automatic repeat request acknowledgement (HARQ-ACK) feedback via a physical uplink control channel (PUCCH) format 0 based at least in part on the downlink data, wherein the HARQ-ACK feedback includes a first HARQ-ACK bit associated with a high priority and a second HARQ-ACK bit associated with a low priority, and wherein the HARQ-ACK feedback is mapped to a sequence cyclic shift value that provides an unequal reliability between the first HARQ-ACK bit and the second HARQ-ACK bit.

* * * * *